(12) United States Patent
Ishida

(10) Patent No.: US 8,700,675 B2
(45) Date of Patent: Apr. 15, 2014

(54) CONTENTS SPACE FORMING APPARATUS, METHOD OF THE SAME, COMPUTER, PROGRAM, AND STORAGE MEDIA

(75) Inventor: Takayuki Ishida, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 278 days.

(21) Appl. No.: 12/522,400

(22) PCT Filed: Feb. 19, 2007

(86) PCT No.: PCT/JP2007/000099
§ 371 (c)(1),
(2), (4) Date: Dec. 23, 2009

(87) PCT Pub. No.: WO2008/114306
PCT Pub. Date: Sep. 25, 2008

(65) Prior Publication Data
US 2010/0100549 A1  Apr. 22, 2010

(51) Int. Cl.
*G06F 17/30* (2006.01)
(52) U.S. Cl.
CPC .... *G06F 17/30286* (2013.01); *G06F 17/30047* (2013.01); *G06F 17/30073* (2013.01); *G06F 17/30017* (2013.01); *G06F 17/30026* (2013.01); *G06F 17/30244* (2013.01); *G06F 17/3074* (2013.01); *G06F 1/3074* (2013.01)
USPC .......... 707/802; 707/803; 707/804; 707/805; 707/812

(58) Field of Classification Search
USPC .......... 707/758, 706, 705, 709, 803–805, 812
See application file for complete search history.

(56) References Cited

U.S. PATENT DOCUMENTS

| | | | | |
|---|---|---|---|---|
| 5,647,022 A | * | 7/1997 | LeCun et al. | 382/156 |
| 6,381,605 B1 | * | 4/2002 | Kothuri et al. | 1/1 |
| 6,418,433 B1 | * | 7/2002 | Chakrabarti et al. | 1/1 |
| 6,490,320 B1 | * | 12/2002 | Vetro et al. | 375/240.08 |
| 6,574,279 B1 | * | 6/2003 | Vetro et al. | 375/240.23 |
| 6,707,950 B1 | * | 3/2004 | Burns et al. | 382/254 |
| 6,912,536 B1 | * | 6/2005 | Ochitani | 707/737 |
| 6,990,628 B1 | * | 1/2006 | Palmer et al. | 715/234 |
| 7,085,755 B2 | * | 8/2006 | Bluhm et al. | 1/1 |
| 7,353,236 B2 | * | 4/2008 | Stickler | 1/1 |

(Continued)

FOREIGN PATENT DOCUMENTS

| | | |
|---|---|---|
| JP | 11175534 A | 7/1999 |
| JP | 2003030240 A | 1/2003 |

OTHER PUBLICATIONS

International Search Report for International Application PCT/JP2007/000099.

(Continued)

*Primary Examiner* — Frantz Coby
(74) *Attorney, Agent, or Firm* — Matthew B. Dernier, Esq.; Gibson & Dernier LLP

(57) ABSTRACT

A space providing server analyzes content to generate meta data. Further the space providing server generates contents space information defining the coordinates of a plurality of main bodies of contents data on a network according to the amount of features thereof, based on the meta data. The terminal apparatus displays a screen which includes image corresponding to the plurality of contents, based on the coordinates included in the contents space information.

21 Claims, 27 Drawing Sheets

(56) References Cited

U.S. PATENT DOCUMENTS

| | | | |
|---|---|---|---|
| 7,788,254 B2* | 8/2010 | Burges et al. | 707/710 |
| 7,941,431 B2* | 5/2011 | Bluhm et al. | 707/736 |
| 8,555,273 B1* | 10/2013 | Chia et al. | 717/173 |
| 2001/0042085 A1* | 11/2001 | Peairs et al. | 707/526 |
| 2002/0045154 A1* | 4/2002 | Wood et al. | 434/350 |
| 2002/0152051 A1* | 10/2002 | Fukushige et al. | 702/179 |
| 2003/0093434 A1* | 5/2003 | Stickler | 707/103 R |
| 2003/0212675 A1* | 11/2003 | Denesuk et al. | 707/5 |
| 2004/0093323 A1* | 5/2004 | Bluhm et al. | 707/3 |
| 2004/0122844 A1* | 6/2004 | Malloy et al. | 707/102 |
| 2005/0234958 A1* | 10/2005 | Sipusic et al. | 707/102 |
| 2006/0038812 A1* | 2/2006 | Warn et al. | 345/419 |
| 2006/0248055 A1* | 11/2006 | Haslam et al. | 707/3 |
| 2006/0248094 A1* | 11/2006 | Andrews et al. | 707/100 |
| 2006/0294077 A1* | 12/2006 | Bluhm et al. | 707/3 |
| 2007/0115495 A1* | 5/2007 | Ebitani | 358/1.14 |
| 2007/0212507 A1* | 9/2007 | Arst et al. | 428/40.1 |
| 2007/0245379 A1* | 10/2007 | Agnihortri | 725/46 |
| 2007/0261535 A1* | 11/2007 | Sherwani et al. | 84/609 |

OTHER PUBLICATIONS

International Preliminary Report on Patentability and Written Opinion for International Application PCT/JP2007/000099.

Kazuhiro Hayakawa et al., "User no Riyo Rireki ni Motozuku WWW server no Chizugata Directory" Information Processing Society of Japan Kenkyu Hokoku, Shadan Hojin Information Processing Society of Japan, vol. 97, No. 2, pp. 17-24 (1997).

* cited by examiner

FIG. 4A

CONTENTS DATA

| c-id | CONTENTS URL | BIBLIOGRAPHIC | | | EXPRESSION IN SPACE | |
|---|---|---|---|---|---|---|
| | | TITLE | ARTIST | | IMAGE | MUSIC |
| 0001 | http://xxx1 | xx1 | yy1 | | http://x1 | http://y1 |
| 0002 | http://xxx2 | xx2 | yy2 | | http://x2 | http://y2 |
| .. | | | | | ... | |

FIG. 4B

CONTENTS META DATA CMD

| c-id | IMAGE META | | | MUSIC META | | | CONTENTS URL |
|---|---|---|---|---|---|---|---|
| | COLOR HISTO. | | SP. FREQ. | TEMPO | CLEARNESS | | |
| | F1 | .. | Fn | G1 .. Gn | P1 .. Pn | Q1 .. Qn | |
| 0001 | 0.3 | .. | 0.2 | | | | http://xxx1 |
| 0002 | | | | | | | http://xxx2 |
| ... | | | | | | | ... |

FIG. 4C

CONTENTS SPACE

| c-id | POSITION | | | CONTENTS URL | BIBLIOGRAPHIC | | EXPRESSION IN SPACE | |
|---|---|---|---|---|---|---|---|---|
| | Xc | Yc | Zc | | TITLE | ARTIST | IMAGE | MUSIC |
| 0001 | 0.11 | -0.4 | 0.92 | http://xxx1 | xx1 | yy1 | http://x1 | http://y1 |
| 0002 | | .. | | http://xxx2 | xx2 | yy2 | http://x2 | http://y2 |
| ... | | | | ... | | | | ... |

FIG. 6A

USER ACTION HISTORY DATA

| uid | c-id | datetime |
|---|---|---|
| 00501 | 0001 | 2006/11/11 10:00:00 |
| 00501 | 0002 | 2006/11/12 09:30:00 |
| ... | | |

FIG. 6B

USER ACTION META DATA MD

| c-id | NUMBER OF REPRODUCTION TIMES CLASSIFIED BY TIME ZONE | | | | RELATIVE REPRODUCTION FREQUENCY | | |
|---|---|---|---|---|---|---|---|
| | 00-06 | 06-12 | 12-18 | 18-24 | low | middle | high |
| 0001 | 12 | 22 | 25 | 438 | 54 | 55 | 9 |
| 0002 | 321 | 348 | 46 | 3 | 8 | 32 | 86 |
| ... | | | | | | | |

CONTENTS SPACE FORMING APPARATUS, METHOD OF THE SAME, COMPUTER, PROGRAM, AND STORAGE MEDIA

BACKGROUND

The present relates to a contents space forming apparatus, a method of the same, a computer, a program, and a storage media which are used for space providing in relation to features of a plurality of contents.

In the systems, such as WWW (World Wide Web), etc., a huge number of contents data are memorized in a plurality of computers.

In such a system, users perform keyword search using search engine, etc. and obtains interested contents among a vast quantity of contents data on a network. In the prior art, the list of the obtained contents is displayed on the screen.

However, in the prior art mentioned above, if the number of the contents displayed in a list becomes huge, it is difficult to grasp the global image (general view) of the contents on a network based on the feature. As a result, it is difficult to obtain the desired contents.

Consequently, when there are huge contents, there is a request for a system which can grasp the global image of contents easily based on the feature of contents.

SUMMARY OF THE INVENTION

This invention is made in view of this situation, and purpose is to provide a contents space forming apparatus, a method of the same, a computer, a program, and a storage media which make it possible to grasp the global image of contents easily based on the feature of contents.

In order to attain the purpose the first aspect of the present invention is a contents space forming apparatus, comprising: a space definition means for defining a space to which said contents are mapped, based on an amount of features of a plurality of types which are defined for each of a plurality of contents; and a coordinates calculation means for calculating coordinates to which each of said contents is mapped in said space defined by said space definition means, based on the amount of features of said plurality of types of contents.

The second aspect of the present invention is a contents space forming method, comprising: a space definition step for defining a space to which said contents are mapped, based on an amount of features of a plurality of types which are defined for each of a plurality of contents; and a coordinates calculation step for calculating coordinates to which each of said contents is mapped in said space defined at said space definition step, based on the amount of features of said plurality of types of contents.

The third aspect of the present invention is a program executed by a computer, comprising: a space definition step for defining a space to which said contents are mapped, based on an amount of features of a plurality of types which are defined for each of a plurality of contents; and a coordinates calculation step for calculating coordinates to which each of said contents is mapped in said space defined at said space definition step, based on the amount of features of said plurality of types of contents.

The fourth aspect of the present invention is a storage media storing a program executed by a computer, said program comprising: a space definition step for defining a space to which said contents are mapped, based on an amount of features of a plurality of types which are defined for each of a plurality of contents, and a coordinates calculation step for calculating coordinates to which each of said contents is mapped in said space defined at said space definition step, based on the amount of features of said plurality of types of contents.

The fifth aspect of the present invention is a data communication method using a contents space forming apparatus and a terminal apparatus, comprising: a space definition step in which said contents space forming apparatus defines a space to which said contents are mapped, based on an amount of features of a plurality of types which are defined for each of a plurality of contents; a coordinates calculation step in which said contents space forming apparatus calculates coordinates to which each of said contents is mapped in said space defined by said space definition step, based on the amount of features of said plurality of types of contents; a transmitting step in which said contents space forming apparatus transmits the coordinates calculated in said coordinates calculation step to said terminal apparatus; and a display processing step in which said terminal apparatus displays a screen which includes image corresponding to said contents, based on the coordinates received in said transmitting step.

The sixth aspect of the present invention is a computer, comprising: a space definition means for defining a space to which said contents are mapped, based on an amount of features of a plurality of types which are defined for each of a plurality of contents; a coordinates calculation means for calculating coordinates to which each of said contents is mapped in said space defined by said space definition means, based on the amount of features of said plurality of types of contents; and a display processing means for displaying a screen which includes image corresponding to said contents, based on the coordinates calculated by said coordinates calculation means.

The 7th aspect of the present invention is a program executed by a computer, comprising: a space definition step for defining a space to which said contents are mapped, based on an amount of features of a plurality of types which are defined for each of a plurality of contents; a coordinates calculation step for calculating coordinates to which each of said contents is mapped in said space defined at said space definition step, based on the amount of features of said plurality of types of contents; and a display processing step for displaying a screen which includes image corresponding to said contents, based on the coordinates calculated in said coordinates calculation step.

The 8th aspect of the present invention is a computer, comprising: a feature amount generation means for analyzing contents to generate an amount of features of a plurality of types about each of a plurality of contents; and a display processing means for transmitting said amount of features generated by said feature amount generation means, and displays a screen which includes image corresponding to said contents, based on the coordinates calculated in a predetermined space which is received corresponding to said transmitting.

The 9th aspect of the present invention is a program executed by a computer, comprising the steps of: a feature amount generation step for analyzing contents to generate an amount of features of a plurality of types about each of a plurality of contents; and a display processing step for transmitting said amount of features generated by said feature amount generation step, and displays a screen which includes image corresponding to said contents, based on the coordinates calculated in a predetermined space which is received.

According to the present invention a contents space forming apparatus, a method of the same, a computer, a program, and a storage media which make it possible to grasp the global image of contents easily based on the feature of contents are can be provided.

BRIEF DESCRIPTION OF THE DRAWINGS

FIG. 4A is a view for explaining contents data.

FIG. 4B is a view for explaining the contents metadata CMD.

FIG. 4C is a view for explaining the contents space information.

FIG. 6A is a view for explaining user action history data, and FIG. 6B is a view for explaining the user action metadata MD.

DETAILED DESCRIPTION

Hereafter, the data communication system of the present embodiment will be explained.

<First Embodiment>

Figure 1:
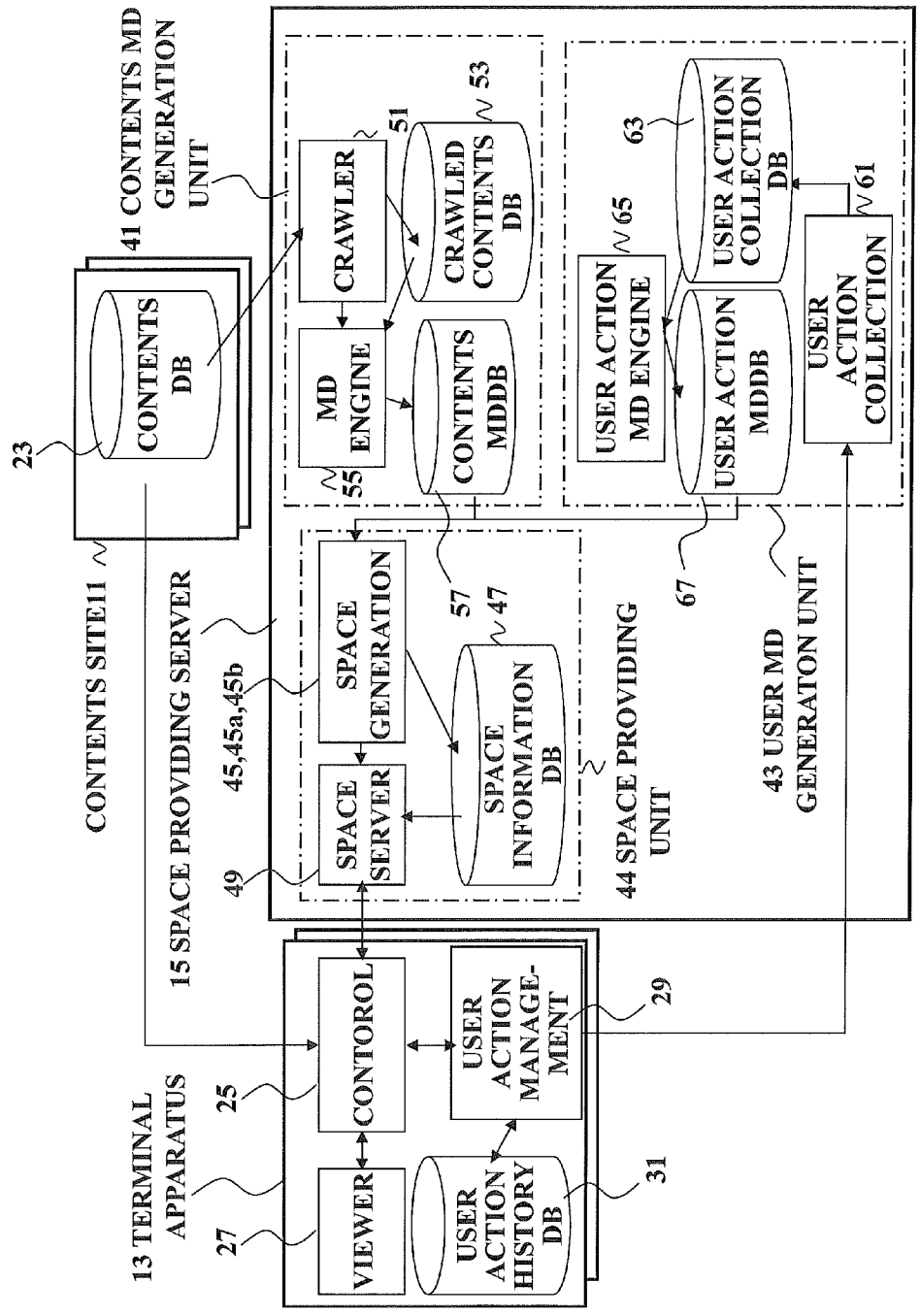
FIG. 1 is a schematic view of block of the data communication system concerning the present embodiment.

FIG. 1 is a schematic view of the data communication system of the present embodiment.

As shown in FIG. 1, the data communication system of the present embodiment includes for example, a plurality of contents site 11, a plurality of terminal apparatuses 13, and a plurality of space providing serves 15.

In the data communication system of the present embodiment, the space providing serve 15 accesses actively a plurality of contents site 11 on a network, analyzes the main part of contents data which the contents sites 11 holds, and generates the metadata (an attribute, an amount of the features) of a plurality of types. And the space providing serve 15 generates contents space information in which coordinates of the main part of a large number of the contents data on a network are defined, based on a plurality of the metadata.

The terminal apparatus 13 displays identification images of the large number of the main part of contents data, based on the coordinates, using the contents space information. At this time, since the coordinates of the main part of contents data are defined based on the amount of the features, a display easy for grasping the feature of the main part of contents data, such as a display easy for searching is attained.

As shown in FIG. 1, a plurality of the contents sites 11 exist on the network, and each contents site 11 stores the main part of contents data in the contents DB 23. The address (URL) of other contents site 11, etc. are described as a link in each main part of contents data.

Hereafter, the function of each block element shown in FIG. 1 will be explained in detail.

[Terminal apparatus 13]

The terminal apparatus 13 includes a control unit control unit 25, a viewer 27, a user action management unit user action management unit 29, a user action history DB (Data Base) 29, and a user action history DB 31 as a functional block, as shown in FIG. 1.

Figure 2:
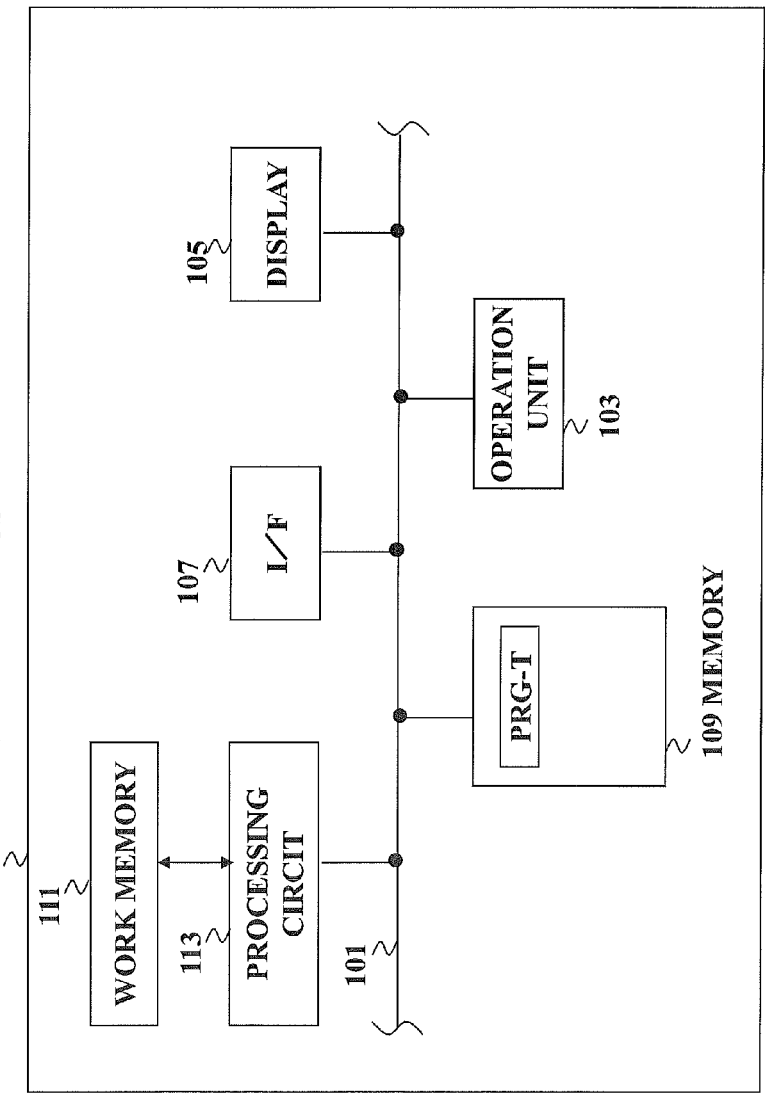
FIG. 2 is a hardware block of the terminal device shown in FIG. 1.

FIG. 2 is a hardware block diagram of the terminal apparatus 13 shown in FIG. 1.

As shown in FIG. 2, the terminal apparatus 13 includes an operation unit operation unit 103, a display 105, an interface 107, a memory 109, a work memory 111, and a processing circuit 113 as hardware block, for example.

The terminal apparatus 13 is a computer, a portable device, and a game machine, for example.

The function of the control unit 25 shown in FIG. 1, the viewer 27 and the user action management unit 29 explained in the present embodiment are realized by making the processing circuit 113 shown in FIG. 2 execute a program PRG-T. That is, the steps of the processing which the viewer 27 and the user action management unit 29 perform in the present embodiment are described in the program PROG-T. Note that, the program PROG-T may be recorded on a recording media, such as an optical disc, a magnetic disk, a magneto-optical disc, and semiconductor memory, and so on, for example. Further, the user action history DB 31 is realized based on the data memorized by the memory 109. As used herein, the term recording media may be used interchangeably with the term computer readable storage media, and refers to tangible physical article(s) excluding signals and carrier waves.

The control unit 25 receives contents space information from the space providing serve 15, and displays the image according to the contents space information on the viewer 27 as described later.

The contents space information is information which defines the coordinates in space according to the amount of the features of the main part of contents data (metadata, attribute). The control unit 25 displays the large number of the main body of contents data on the network on the display 105 in the form easy to search by user according to the feature thereof The control unit 25 downloads the main part of contents data from the contents site 11 through a network according to an operation of the operation unit 103 by a user, and displays the image according to the operation on the display 105 using the function of the viewer 27.

The user action management unit 29 generates a user action history data, based on the main part of contents data downloaded from the contents site 11 by the operation signal from the operation unit 103 according to the user' operation or by the operation, for example.

The user action management unit 29 writes the generated user action history data into the user action history DB 31.

Further, the user action management unit 29 transmits the generated user action history data to the user action collection unit 61 of the space providing serve 15 through network.

[Space Providing Serve 15]

The space providing serve 15 analyzes the main part of contents data on a network to generate a metadata, and generates a contents space based on it.

The space providing serve 15 includes the contents MD generation unit 41, the user MD generation unit 43, and the space providing unit 44, as shown in FIG. 1.

Figure 3:
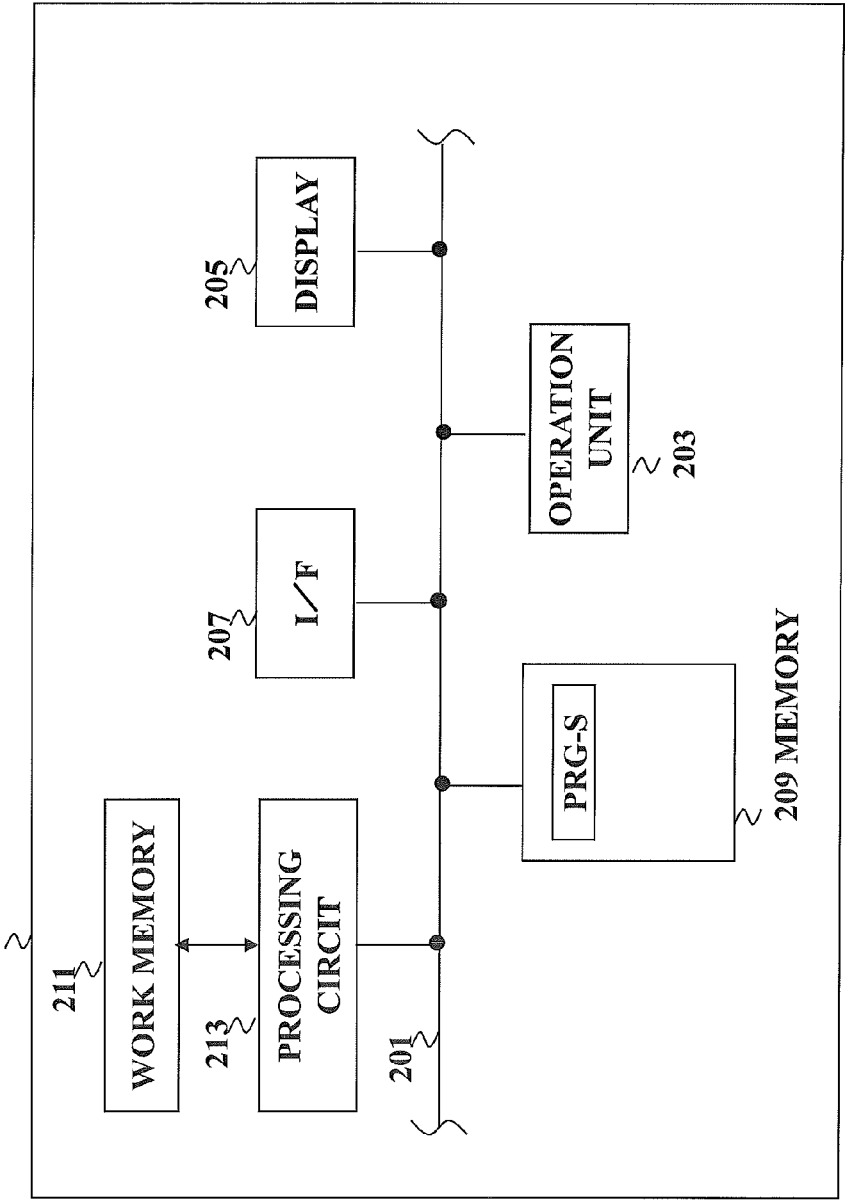
FIG. 3 is a hardware block of the space providing server shown in FIG. 1.

FIG. 3 is a hardware block diagram of the space providing serve 15 shown in FIG. 1. As shown in FIG. 3, the space providing serve 15 includes a operation unit 203, a display 205, an interface 207, a memory 209, a work memory 211, and a processing circuit 213 as hardware block, for example.

Each functional block in the space providing serve 15 shown in FIG. 1 is realized by executing the program PRG-S by the processing circuit 213 shown in FIG. 3. That is, the steps of the processing which each functional block of the space providing serve 15 performs in this embodiment are described in the program PROG-S. In addition, the program PROG-S may be recorded on recording media, such as an optical disc, a magnetic disk, a magneto-optical disc, and semiconductor memory, and so on, for example.

[Contents MD Generation Unit 41]

As shown in FIG. 1, the contents MD generation unit 41 includes a crawler 51, crawled contents DB 53, a contents MD engine 55, and a contents MDDB 57.

Here, the contents MD engine 55 is an example of a feature amount obtaining means used for this invention.

The crawler 51 accesses the contents site 11 on a network actively, and downloads the main part of contents data stored in the contents site 11 and attribute thereof.

The crawler 51 receives automatically the main part of contents data of a predetermined attribute among the main part of contents data provided by the contents site 11 on a network, according to the conditions set up beforehand, for example.

Further the crawler 51 also downloads the main part of contents data to which other contents sites linked by the contents site 11. The crawler 51 stores the downloaded main part of contents data and the attribute thereof as contents data into the crawled contents DB 53.

The crawled contents DB 53 stores an identification data c-id of the contents data to be stored, a URL (address on a network) at which the contents data is stored, a bibliographic matter (a title, an artist), and an expression in the space, for example, as shown in FIG. 4A.

The expression in space is URL of the image data and music data corresponding to the contents data, for example. This image data is a thumbnail image, for example. Further, music data is viewing-and-listening music data, for example.

The contents MD engine 55 analyzes the contents data stored in the crawled contents DB 53 by signal processing to generate the contents metadata CMD, and writes this in the contents MDDB 57.

For example, the contents MD engine 55 generates contents metadata CMD shown in FIG. 4B based on the contents data shown in FIG. 4A.

Specifically the contents MD engine 55 accesses the main part of contents data on a network based on the URL to perform analysis, etc. by signal processing, and generates low level metadata LMD.

The low level metadata LMD is an attribute computable in signal processing about contents data, and indicates the physical and mechanical numerical value, for example.

The low level metadata LMD is used for the space generation (formation of the base space and the calculation of the coordinates of the contents).

When the main part of contents data is image data, the contents MD engine 55 extracts image attribute data, such as the color histogram and spatial frequency, and stores it in the contents metadata CMD as the low level metadata LMD.

Further, when the main part of contents data is music data, the contents MD engine 55 extracts voice attribute data, such as the tempo and clearness, etc. by analyzing a frequency composition, and stores it into the contents metadata CMD as the low level metadata LMD.

The contents MD engine 55 performs a predetermined study processing to generate the high level metadata HMD, based on the low level metadata LMD. Alignment, nonlinearity, etc. are used as a study rule for the study processing.

Figure 5:
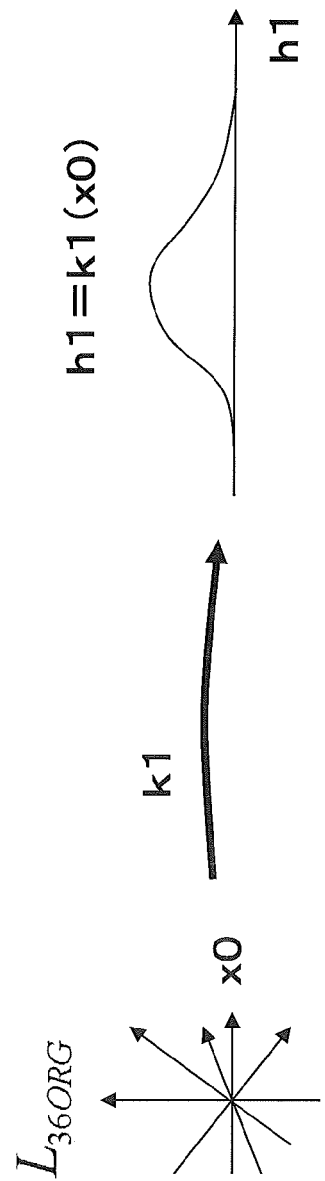
FIG. 5 is a view for explaining the processing which generates the high level metadata HMD from the low level metadata LMD.

The contents MD engine 55 generates one-dimensional value h1 of the high level metadata HMD from the low level metadata HMD of n dimension (for example, 36 dimensions), based on FIG. 5 and the following formula (1), for example.

In the following formula (1), x0 is a vector (x01, x02, ..., x0n) which indicate the value of each dimension of the low level metadata LMD, and k1 is an alignment function. Further, the coefficient defined with the alignment function k1 is shown b11, b12, ..., b1n.

[Formula 1]

$$h1 = k1(x0) = b11*x01 + b12*x02, \ldots, b1n*x0n \qquad (1)$$

The high level metadata HMD indicates the amount of the features (attribute) near human understanding about the contents data.

The high level metadata HMD, as described later, is used for improving a user's visibility and a grasp disposition.

The contents MD engine 55 treats the metadata of the one attribute as two metadata, when large and small image are reverse about one attribute, or when two meanings can be taken about the height of a value.

Further, as the low level metadata LMD and the high level metadata HMD, there are continuation value data (analog type) and discrete data (0, 1). Here, with respect to a pattern having characteristic of data which is not a continuation value and having the discrete value, the method taking value from the highest value to 0.5 can't be used. Therefore it is used as the rate of "1" standing among the whole object.

Note that, the contents MD engine 55 may generate the high level metadata HMD by using only the low level metadata LMD, and may generate the high level metadata HMD at a server except for the space providing serve 15. Further, the contrary may be sufficient Hereafter, various kinds of examples of the low level metadata LMD and the high level metadata HMD according to the types of the contents metadata CMD will be explained.

[Example 1 of Metadata (Music Data)]

When the contents metadata CMD is music data, the low level metadata LMD and the high level metadata HMD are as follows, for example.

In this case, as a dimension (the amount of the features) of the low level metadata LMD, the amount of the features about musical tempo, amplification, etc. are used, for example.

As the dimension of the high level metadata HMD, the amount of the features about genre, graceful, cool, grand, lively, quiet, peaceful, etc. of music, such as Jazz, Pop, Rock, Vocal, computer music, and enka are used.

[Example 2 of Metadata (Image Data)]

When the contents data is image data, the low level metadata LMD and the high level metadata HMD are as follows, for example.

The contents MD engine 55 generates the hue value of each pixel of the contents data of the image read from the crawled contents DB 53, for example. A hue value is a value indicating a hue which is the attribute of the color charactering the character of color sensation, such as red, yellow, green, blue, and purple color.

At this time, the contents MD engine 55 quantizes the range which a hue value can take among contents data, and generates H1 to Hn. Here, when assuming that n is every "1" degree of "360" degrees in angle, n meets the condition that "n=360", for example.

And the contents MD engine 55 computes "(the number of pixels having Hi)/(the total number of pixels)", and set the result to Zi. with respect to I (1 i n).

By this, the low level metadata LMD which has Z1 to Zn as a dimension is generated about each contents data.

Further as other examples, the contents MD engine 55 performs spatial frequency conversion, such as discrete cosine transform (DCT), etc. with respect to the contents data of the image read from the crawled contents DB 53 to generate frequency coefficients S1 to Sm, and use it as dimension of the low level metadata LMD.

Further, the contents MD engine 55 performs a pattern recognition processing to the contents data of the image read from the crawled contents DB 53, and recognizes the face image which exists in the image. And the contents MD engine 55 detects the following three attributes F1, F2, and F3 by the above-mentioned recognition processing.

F1=The number of face detected in one image.

F2=Similarly the ratio of the square which is occupied by face image with respect to the square of whole image.

F3=The inclination angle of a mouth. It is assumed that the inclination angle of a mouth can be used for a laughter face and an anger face)

And the contents MD engine 55 uses the three above-mentioned attributes F1, F2, and F3 as dimensions of the high level metadata HMD.

Further as other examples, the contents MD engine 55 performs an object segmentation processing to the contents data of the image read from the crawled contents DB 53, and recognizes an artificial object image which exists in the image concerned.

And the contents MD engine 55 detects the following two attributes A1 and A2 by the above-mentioned object segmentation processing.

A1=The number of the object comprising a straight line (using property that buildings includes a straight line in many cases).

A2=Similarly the ratio of the square which is occupied by the image with respect to the square of whole image.

And the contents MD engine 55 uses the two above-mentioned attributes A1 and A2 as dimensions of the high level metadata HMD.

[Example 3 of Metadata (Video Data)]

When the contents data is a video data, the low level metadata LMD and the high level metadata HMD are as follows, for example.

The contents MD engine 55 performs a motion vector detection processing to the contents data of video read from the crawled contents DB 53 to detect the motion vector of the video.

And the contents MD engine 55 detects the following two attributes M1 and M2 by the above-mentioned motion vector detection processing.

M1=Average value of the size of a motion vector over the whole volume.

M2=Appearance probability of the motion vector having larger size than a fixed size.

And the contents MD engine 55 uses the two above-mentioned attributes M1 and M2 as dimensions of the low level metadata LMD.

As other examples, the contents MD engine 55 performs scene detection processing to the contents data of the video read from the crawled contents DB 53, takes correlation of continuation frames, and detects a scene change.

And the contents MD engine 55 detects the following two attributes S1 and S2 by the above-mentioned scene detection processing.

S1=The total number of scenes in the whole volume

S2=The average time of one scene

And the contents MD engine 55 uses the two above-mentioned attributes S1 and S2 as dimension of the low level metadata LMD.

Further, the contents MD engine 55 performs a person appearance ratio detection processing to the contents data of the video read from the crawled contents DB 53, and detects the following two attributes H1 and H2.

In the person appearance ratio detection processing, the contents MD engine 55 presumes appearance of person by synthetically performing facial recognition, voice detection, and un-artificial object detection.

H1=The average value of the person's appearance ratio in the whole volume.

H2=The number of the appearing person

And the contents MD engine 55 uses the two above-mentioned attributes H1 and H2 as dimensions of the high level metadata HMD.

As other examples, the contents MD engine 55 performs a video type presumption processing to the contents data of the video read from the crawled contents DB 53, and detects following attributes M1 to M4.

In the video type presumption processing concerned, the contents MD engine 55 performs synthetically person detection, motion detection, and laughing voice detection, and presumes the kind of video.

M1=degree of fitting for sports (it expresses with 0 to 100).
M2=degree of fitting for news program.
M3=Comedy
M4=Popular music program And the contents MD engine 55 uses the above-mentioned attributes M1 to M4 as dimensions of the high level metadata HMD.

[Example 4 of Metadata (Text Data)]

When contents data is text data, the low level metadata LMD and the high level metadata HMD are as follows, for example.

The contents MD engine 55 performs a word split processing to the contents data of the text read from the crawled contents DB 53, and detects the following two attributes T1 and T2.

In the word split processing the contents MD engine 55 divides each text into words by a morphological analysis, and puts id of word_id=1, 2, . . . , n to the different word.

T1=The number of times of appearance of word_id1
T2=The number of times of appearance of word_id2

For example the text data "today is fine" will be divided into "today", "is" and "fine".

And the contents MD engine 55 uses the two above-mentioned attributes T1 and T2 as dimensions of the low level metadata LMD.

Further, the contents MD engine 55 performs an ontology processing to the contents data of the text read from the crawled contents DB 53, and detects the following two attributes O1, O2, . . . .

In the ontology processing the contents MD engine 55 summarizes each word in the unit of a meaning and puts id=1, 2, . . . m to the word of the ontology.

O1=The number of times of appearance of id1
O2=The number of times of appearance of id2

For example, the words "skiing" and "skating" are summarized in the unit of the meaning "winter sports."

And the contents MD engine 55 uses the two above-mentioned attributes O1, O2, . . . as dimensions of the high-level metadata HMD.

[User MD Generation Unit 43]

The user MD generation unit 43 generates a user action metadata MD (Meta Data) which indicates attribute of the action of each user and a whole user based on the user action history data from the terminal apparatus 13.

Here, the user MD generation unit 43 is an example of the user usage form analyzing means used for present invention.

As shown in FIG. 1, the user MD generation unit 43 includes a user action collection unit 61, a collection user action DB 63, a user action MD generation engine 65, and a user action MDDB 67, for example.

The user action collection unit 61 stores the user action history data received from the user action management unit 29 of a plurality of the terminal apparatuses 13 into the collection user action DB 63

The user action history data matches and indicates a user identification data uid, contents identification data c-id, and a "datetime" indicating date and time when user action has occurred, as shown in FIG. 6A.

The user action MD generation engine 65 analyzes the user action history data stored by the collection user action DB 63 to generate a user action metadata MD, and stores this in the user action MDDB 67.

For example based on each user's user action history data shown in FIG. 6A, the user action MD generation engine 65 generates the user action metadata MD which indicates the time zone when the contents data is reproduced, and the relative reproduction frequency between other contents data in each user with respect to each contents data as shown in FIG. 6B.

Further, the user action MD generation engine 65 generates the low level metadata LMD and the high level metadata HMD which constitute the user action metadata MD based on the attribute data related with the contents data, as shown below.

Based on the above-mentioned attribute data, the user action MD generation engine 65 generates two types of the following features: T1 to T4, and F1 to F3, and use same as dimensions of the low level metadata LMD.

The number of reproduction times classified by time zone:
The statistics value indicating time zone on a day in which the music has been viewed and listened.

T1=total number of times which the music has been viewed and listened during 0:00 to 6:00 (Sum of all users).
T1=total number of times which the music has been viewed and listened during 6:00 to 12:00 (Sum of all users).
T1=total number of times which the music has been viewed and listened during 12:00 to 18:00 (Sum of all users).
T1=total number of times which the music has been viewed and listened during 18:00 to 24:00 (Sum of all users).

Relative reproduction frequency: Ratio of time in which the music has been reproduced to all of the time for reproduction of a certain user.

F1=The percentage of users who reproduce the music by low ratio.
F2=The percentage of users who reproduce the music by middle ratio.
F3=The percentage of users who reproduce the music by high ratio.

Further, based on the above-mentioned attribute, the user action MD generation engine 65 generates following amount of features P1 to Pn, and uses it as dimensions of the high level metadata HMD.

The high level metadata HMD is statistics data in which correlation of a user profile and the number of times of reproduction is shown.

Note that, it is assumed that occupational description, sex, and area of each user have been inputted into the client device beforehand.

P1=The occupational description of person who listens to the music above fixed frequency is "office worker."
P2=The occupational description of person who listens to the music above fixed frequency is "student."
P3=The resident area of person who listens to the music above fixed frequency is "city zone."

[Space Providing Unit 44]

As shown in FIG. 1, the space providing unit 44 includes a space generation unit 45, a space information DB 47, and a space server 49.

Here, the space generation unit 45 is an example of the space definition means and a coordinates calculation means of the present invention. Here, the function of step S2 shown in FIG. 7 corresponds as an example of a space definition means, and the function of step S3 corresponds as an example of a coordinate calculation means.

The space generation unit 45 forms the contents space defining the coordinates of main part of a large number of the contents data in accordance with the amount of the features of the main part of contents data concerned, based on the contents metadata CMD from the contents MD generation unit 41 and the user action metadata MD from the user MD generation unit 43.

Figure 7:
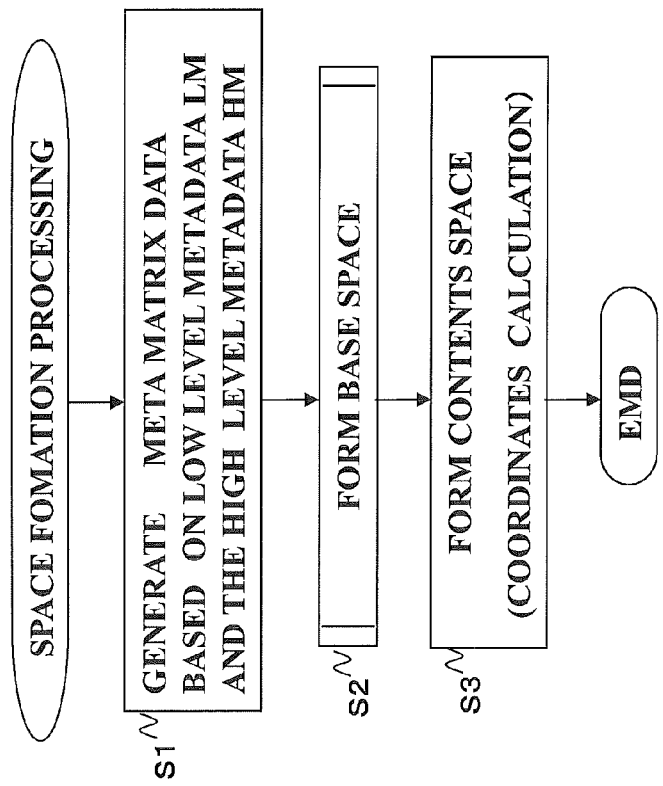
FIG. 7 is a flow chart for explaining the processing which the space generation unit performs.

FIG. 7 is a flow chart for explaining the processing performed by the space generation unit 45.

Step S1:

The space generation unit 45 generates the meta matrix data MMD about each contents data based on the contents metadata CMD inputted from the contents MD generation unit 41.

Figure 9:
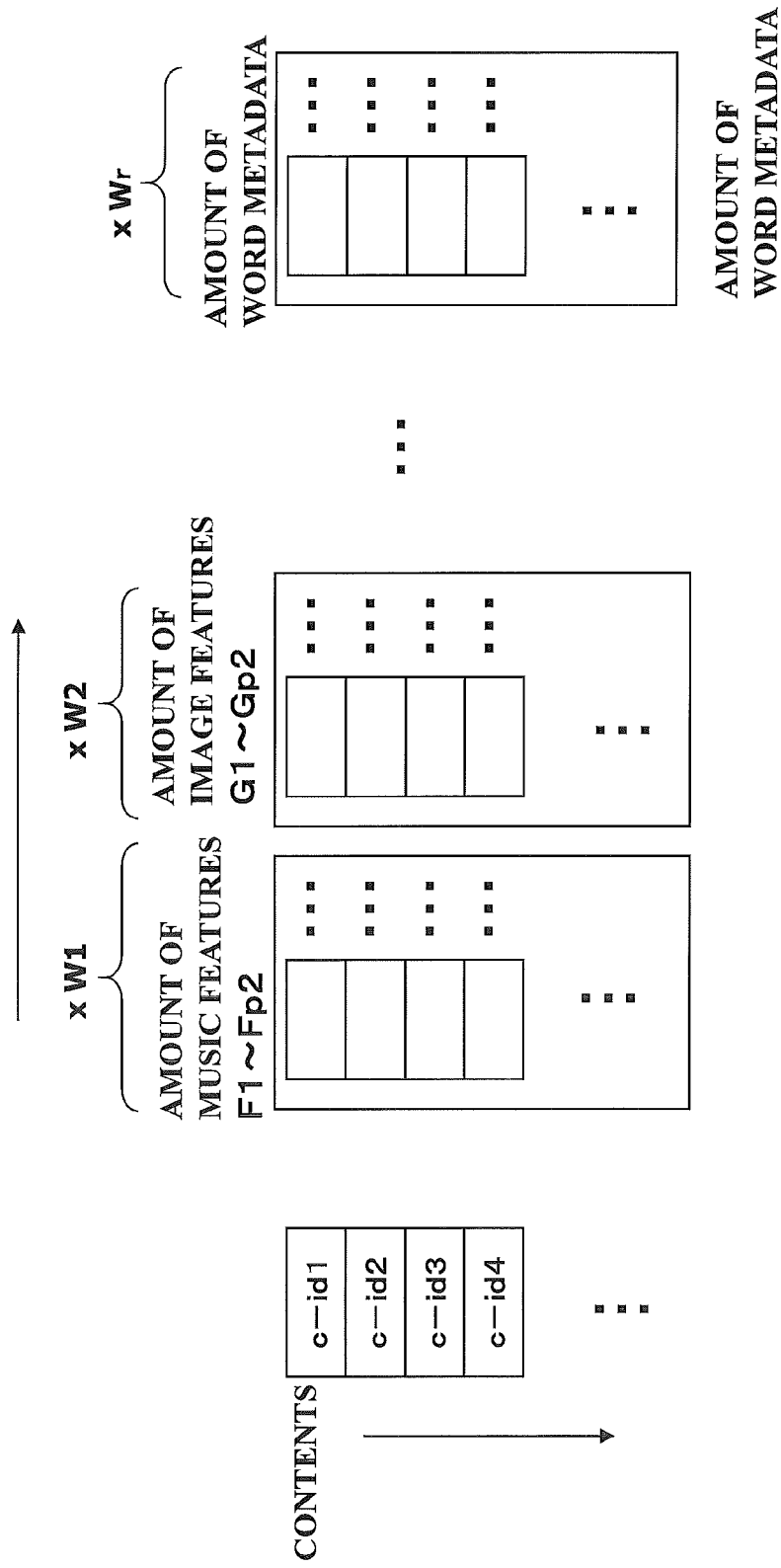
FIG. 9 is a view for explaining the meta matrix data MMD.

The space generation unit 45 generates the meta matrix data MMD indicating a plurality of attributes, such as the amount of the music features, the amount of the image features, and the word meta, etc. about each contents data, for example, as shown in FIG. 9. The both of the low level metadata LMD and the high level metadata HMD which mentioned above are included in the attribute of the meta matrix data MMD of each contents data shown in FIG. 9.

Note that, in the present embodiment, the amount of the features of r dimensions which constitute the low level metadata LMD is used in formation (generation) of the base space and the contents space.

Step S2:

As shown in FIG. 9, the space generation unit 45 multiplies each dimension of the low level metadata LMD with weighted coefficients W1 to Wr to form the base space, for example. That is, determining weighted coefficients W1 to Wr means forming the base space.

Figure 8:
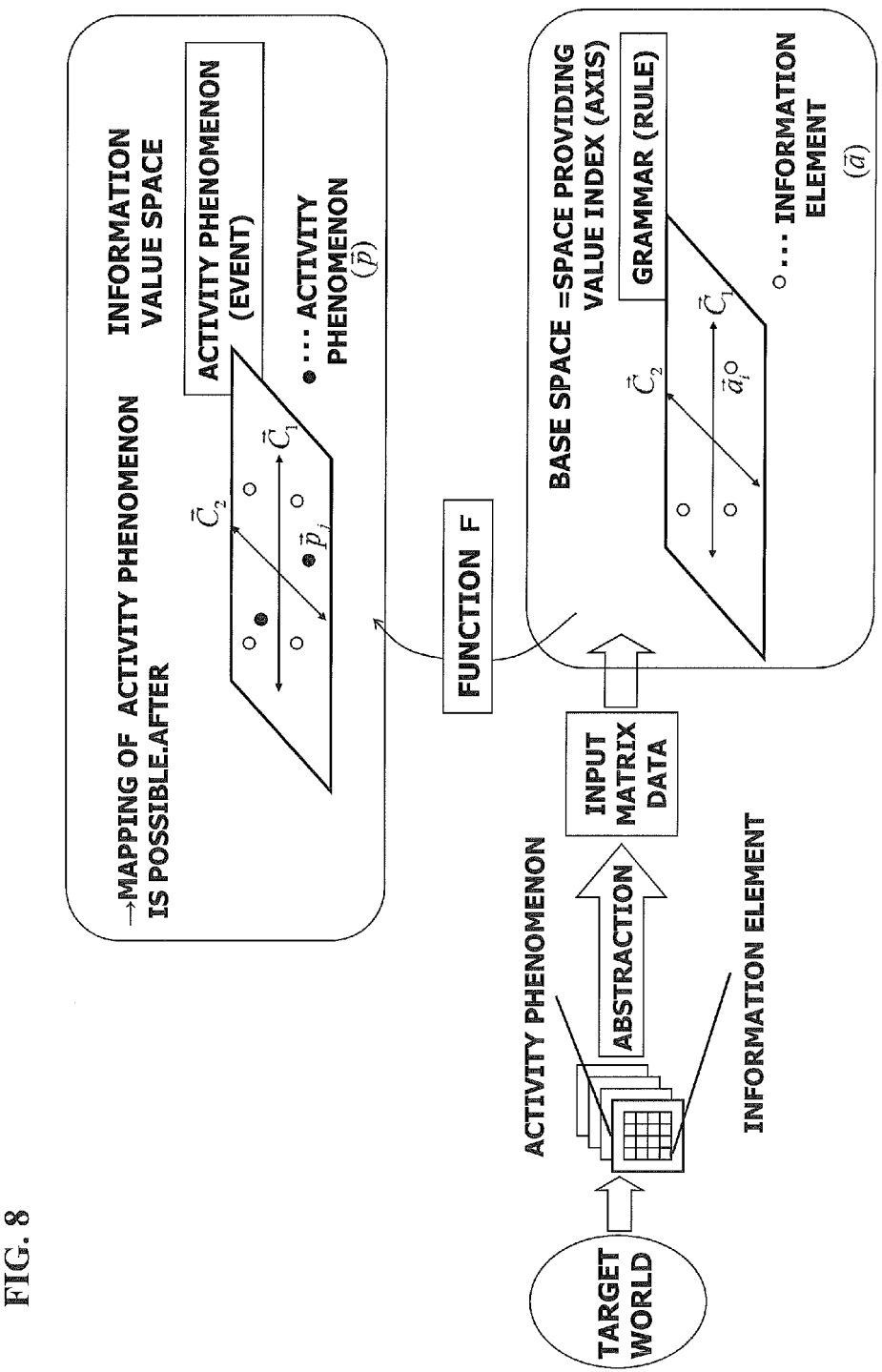
FIG. 8 is a view for explaining the formation method of base space and contents space.

Here, the base space is a space which expressed the law nature and grammar (rule) of communication based on a matrix data of the information element of activity phenomenon obtained from the object world, for example, as shown in FIG. 8.

The axis (dimension) for providing value indicator is defined in order to define the space.

Note that, when determining unique base space for each user of the terminal apparatuses 13, the space generation unit 45 determines the axis (dimension) forming the base space, on the basis of the user action metadata MD inputted from the user MD generation unit 43.

The formation processing of the base space will be explained in detail later.

Step S3:

The space generation unit 45 forms contents space based on the base space formed at step S2.

The contents space is a space which is formed by mapping activity phenomenon afterwards, based on the attribute value of the activity phenomenon, as shown in FIG. 8.

The contents space is formed based on a plurality of attributes which are respectively indicated for each contents data, and each contents data is assigned to predetermined coordinates (mapped).

Specifically the space generation unit 45 generate (calculate) the coordinates in the base space of the contents data by using techniques, such as multivariate analysis, SOM (Self Organization Map), GA, for example, on the basis of the metadata (the amount of the features) of dimension of the low level metadata LMD of each contents data shown in FIG. 9, and the weighted coefficients W1 to Wr determined corresponding to the dimension at step S2.

For example, it is assumed that the contents data CNT1 has metadata M2, M3, M6, and M8, and does not have the other metadata.

Further, it is assumed that the coordinates on the base space of the metadata M2, M3, M6, and M8 are P2, P3, P6 and P8 respectively. In this case, the coordinates of the contents data CNT1 is calculated as the barycenter of the coordinates P2,P3,P6 and P8, such as a vector PC1 which is calculated on the basis of the formula "(vector P2+vector P3+vector P6+vector P8)/4".

Further, simple example is as follows. When the base space is defined by the three dimensions (F1, F2, G1) of metadata shown in FIG. 9, value of F1, F2, G1 of the low level metadata of each contents data are used as value of the X,Y,Z-axis in the contents space respectively.

In the present embodiment, the contents space is three dimensions, and the coordinates are ($X_{ci}$, $Y_{ci}$, $Z_{ci}$), for example.

In the present embodiment, the coordinates of each contents data generated by the space generation unit 45 are logic coordinates, for example. The terminal apparatus 13 determines the display coordinates at which the image corresponding to each contents data is displayed on a display based on the logic coordinates.

The contents space information, as shown in FIG. 4C, for example, includes an identification data c-id, a coordinate (position) ($X_{ci}$, $Y_{ci}$, $Z_{ci}$), a address (URL) thereof, a bibliographic data (a title, an artist), an expression data (URL of image data, URL of music data) in the contents space, etc. of each contents data.

Note that, the space generation unit 45 may express the Euclid coordinates ($X_{ci}$, $Y_{ci}$, $Z_{ci}$) of each contents data by polar coordinates (r, theta, phi), and project them on "r=1".

In addition, since (0, 0, 0) of the Euclid coordinates (X, Y, Z) cannot be expressed in a polar coordinate system, the space generation unit 45 expresses it in polar coordinate system by treating it as coordinate near (0, 0, 1), (1, 0, 0) or (0, 1, 0), etc. which are coordinates near (0, 0, 0).

Thus, it become easy to express the image corresponding to the contents data on a surface of a sphere, and make it easy that user recognizes direction in the space on a screen, by expressing the coordinates of contents data using polar coordinates.

That is, the space generation unit 45 forms the base space based on the low level metadata LMD which is indicated by the meta matrix data MMD shown in FIG. 9, for example, and forms the contents space based on the base space.

The space generation unit 45 writes the information of the base space and the contents space mentioned above into the space information DB 47 as contents space information.

And the space server 49 downloads the contents space information stored in the space information DB 47 into the terminal apparatus 13 by using PUSH system or PULL system.

A explanation of the weighted coefficients W1 to Wr used by the formation of the base space in step S2 shown in FIG. 7 mentioned above will be made hereafter.

Note that, a fixed value may be used for the weighted coefficient W1 to Wr.

[Determination Processing of Weighted Coefficients W1 to Wr]

Figure 10:
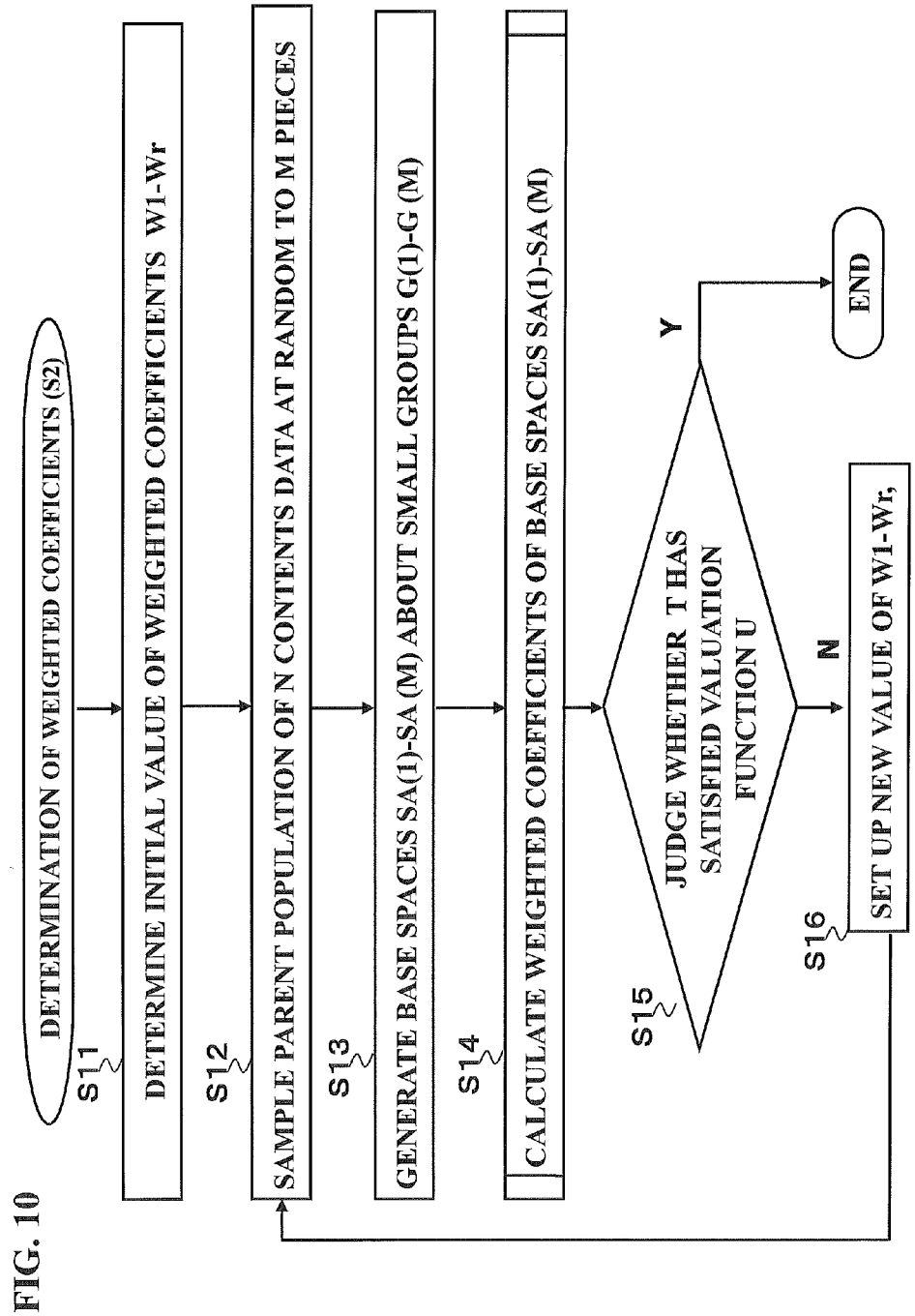
FIG. 10 is a flow chart for explaining the determination processing of weighted coefficients W1 to Wr which the space generation unit shown in FIG. 1 performs at Step S2 shown in FIG. 7.

FIG. 10 is a flow chart for explaining the determination processing of weighted coefficients W1 to Wr which the space generation unit 45 shown in FIG. 1 performs at step S2 shown in FIG. 7.

The determination processing searches the axis on the assumption that there is axis of the value which is inherent in all contents data. And the determination processing is based on the way of thinking that even if it divides N contents data into M small groups, when there is a statistically appropriate quantity (=N/M), the same space is obtained.

That is, it is generated by counting backward from the appeared phenomenon data by using the nature that if the weighted coefficients W1 to Wr are determined correctly, a valuation function U will be satisfied, otherwise, it is not satisfied.

Step S11:

The space generation unit 45 determines the initial value of the weighted coefficients W1 to Wr. The initial value is arbitrary.

Step S12:

The space generation unit 45 samples the parent population of N number of contents data among the contents data stored in the contents MDDB 57 shown in FIG. 1 into M pieces at random. Thereby, M small groups G(1) to G(M) are generated Step S13:

The space generation unit 45 generates the base spaces SA(1) to SA(M) based on the weighted coefficients W1 to Wr about each of M number of the small groups G(1) to G(M) generated at step S12.

Figure 11:
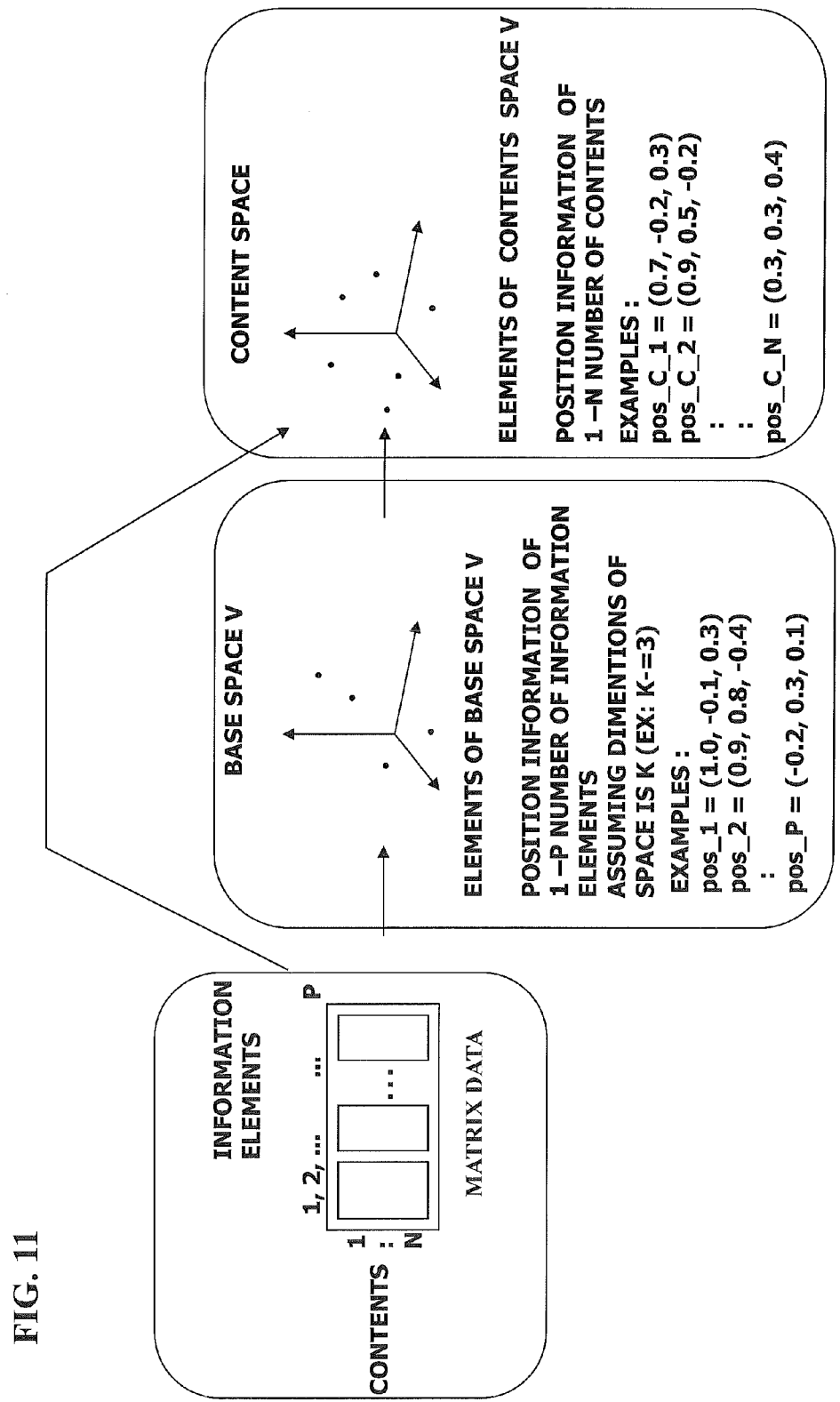
FIG. 11 is a view for explaining the method of the formation of base space and content space.

In the case of the matrix data shown in FIG. 9 and FIG. 11, each of the base spaces SA(1) to SA(M) is defined by a predetermined dimension (for example, three dimensions), and the position information of each information element (the amount of the features, dimensions) is determined. "P" indicating the number of types of the information element shown in FIG. 11 corresponds to total number of the dimension shown in FIG. 9, for example.

The space generation unit 45 generates the position information of an information element by using techniques, such as a multivariate analysis, SOM, Genetic Algorithm (GA), and so on, for example.

Specifically the space generation unit 45 generates value by carrying out the multiplication of the W1 to Wr to each value of each row in FIG. 9, and, places the result with a matrix A (N' row and P column). The left figure of FIG. 11 is a matrix A thereof.

Here, each row corresponds to the contents and each column corresponds to the information element.

The space generation unit 45 regards each column "1 to P" as a column vector of each information element with respect to the matrix A. The space generation unit 45 places the information element so that the information element with high degree of vector similarity is put on the neighborhood, using multivariate analysis, such as principal component analysis, etc. Here, since the multivariate analysis, such as principal component analysis, etc. are well-known techniques, detail description for it are omitted.

Note that, besides the technique mentioned above, well-known technique by which the information element with high degree of vector similarity are put on the neighborhood, such as quantification three kind, correspondence analysis, Self Organization Map (SOM), Genetic Algorithm (GA), etc. can be used.

Note that, when placing it into the three-dimensional space using principal component analysis, it is implemented by selecting three dominant axes from the larger one (it corresponds to three characteristic vectors corresponding to three as order with a high value of characteristic value) and making it correspond to the X-axis, Y-axis and Z-axis of display space, respectively.

Step S14:

The space generation unit 45 calculates the degree T of coincidence of the base spaces SA(1) to SA(M) generated at step S13.

The processing concerned will be explained in detail later.

Step S15:

The space generation unit 45 judges whether the degree T of coincidence calculated at step S14 has satisfied the valuation function U, ends processing when it is judged that it is satisfied, and it progresses to step S16 when it is judged that it is not satisfied.

The space generation unit 45 uses the valuation function U which distinguishes on condition that the degree T of coincidence is higher than a predetermined threshold value, for example. It is because the purpose will be attained if a predetermined height is obtained as a degree of coincidence of the base spaces SA(1) to SA(M).

Step S16:

The space generation unit 45 sets up new weighted coefficients W1 to Wr, and returns to step S12.

The space generation unit 45 determines the new weighted coefficients W1 to Wr by solution processing of minimum search problem of calculating the minimum value in which the weighted coefficients W1 to Wr are used as input (variable parameter), and the reciprocal of degree T of coincidence is output, for example. As the solution processing concerned, annealing method, heredity algorithm, maximum diving method, powell method, etc. are used, for example.

Here, the annealing a method is method for slipping out of a local minimum by using method in which if the degree T of coincidence improves by the parameter change, it adopts the change fundamentally although it rejects the change by fixed probability, and if it goes bad, it rejects the change fundamentally although it adopts the change by fixed probability

[Step S14 (FIG. 10)]

Figure 12:
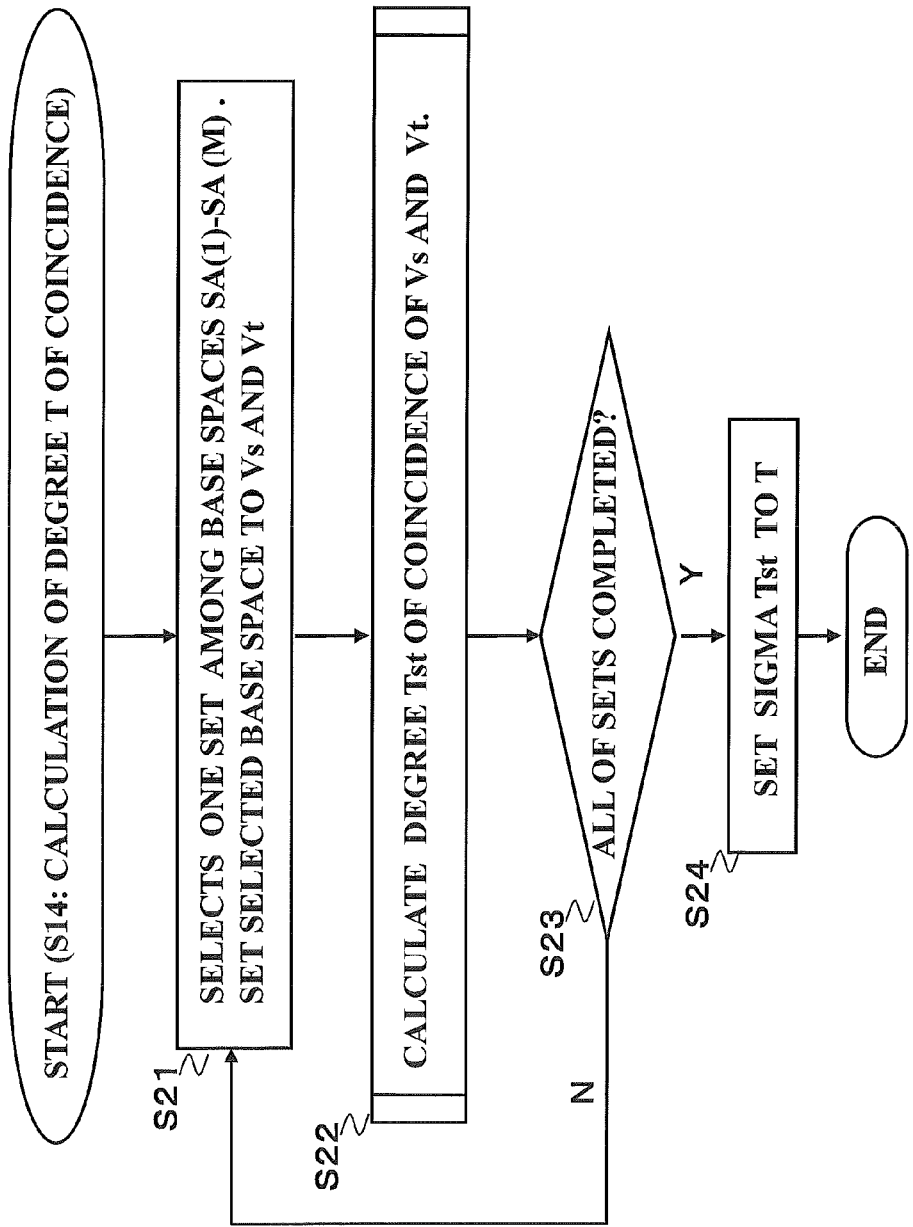
FIG. 12 is a flow chart for explaining the calculation processing of the degree T of coincidence of Step S14 shown in FIG. 10.

FIG. 12 is a flow chart for explaining calculation processing of the degree T of coincidence of step S14 shown in FIG. 10.

Step S21:

The space generation unit 45 selects one set of base space which the degree T of coincidence has not been detected among the base spaces SA(1) to SA(M) generated at step S13 shown in FIG. 10.

One of the selected one set of the base space is set to Vs, and another is set to Vt.

Step S22:

The space generation unit 45 calculates the degree Tst of coincidence of the base space Vs and the base space Vt.

The algorithm of the calculation concerned will be mentioned later.

Step S23:

The space generation unit 45 judges whether the degree Tst of coincidence has been detected about all the combination of base spaces SA(1) to SA(M) generated at step S13 shown in FIG. 10. And, when the space generation unit 45 judged that the degree of coincidence about all combination has been detected, the space generation unit 45 progresses to step S24.

Step S24:

The space generation unit 45 calculates the degree T of coincidence by accumulating the degree Tst of coincidence about all the combination calculated at step S22.

[Step S22 (FIG. 12)]

Figure 13:
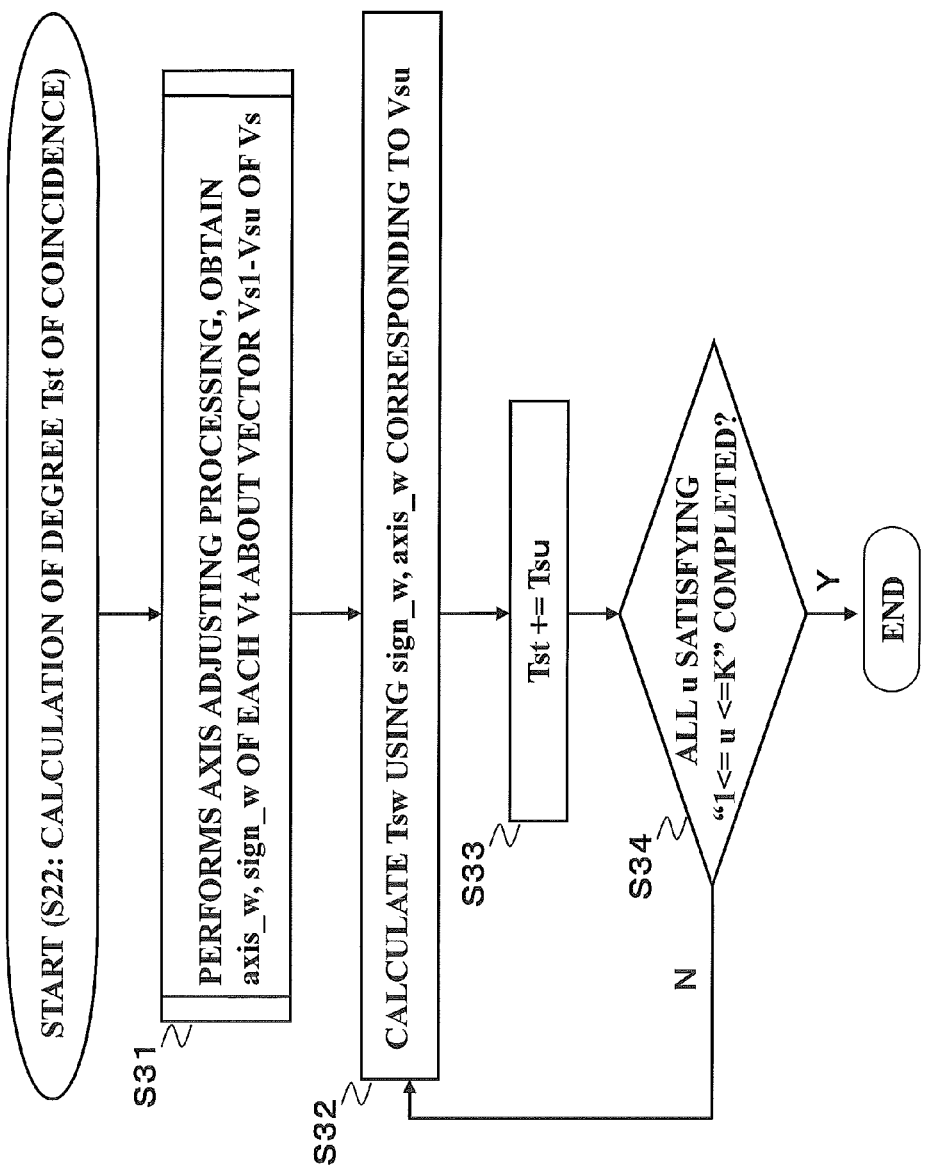
FIG. 13 is a flow chart for explaining the calculation processing of the degree Tst of coincidence of Step S22 shown in FIG. 12.

FIG. 13 is a flow chart for explaining the calculation processing of the degree Tst of coincidence at step S22 shown in FIG. 12.

Step S31:

The space generation unit 45 performs an axis adjusting processing with the base space Vs and the base space Vt which were selected at step S21, and obtains sign_w, axis_w of each base space Vt about vectors Vs1 to Vsu of u dimensions of the base space Vs. The vector concerned corresponds to the axis in the base space.

The space generation unit 45 obtains sign_w, axis_w of each base spaces Vt about each vectors Vs1 to Vsu.

Here, sign_w of each vectors Vs1 to Vsu indicates "+1", when the direction of the vectors concerned is in agreement with the direction of the vector of the base space Vt corresponding to the vector concerned, and indicates "−1" when reverse.

Further, each axis_w of vectors Vs1 to Vsu indicates the vector of the base space Vt corresponding to the vector concerned.

Further, the above "w" indicates the value for the number of the axis_which may be changed in order in the range of "1 w p (the number of axes, the number of dimensions)", as mentioned later.

For example, in the example of the following table 1, the axis of Vt corresponding to vector Vs1 is Vt1, and it means that the direction of positive/negative is reverse. Moreover, the axis of Vt corresponding to vector Vs2 is Vt3, and it means that the direction of positive/negative is in agreement. Moreover, the axis of Vt corresponding to vector Vs3 is Vt2, and it means that the direction of positive/negative is in agreement.

TABLE 1

| Vsi | sign_i | axis_i |
|---|---|---|
| Vs1 | −1 | Vt1 |
| Vs2 | +1 | Vt3 |
| Vs3 | +1 | Vt2 |

Step S32:

The space generation unit 45 calculates the degree Tsu of coincidence using sign_w, axis_w corresponding to each vector Vsu of the base space Vs.

At this time as shown in the above-mentioned table 1, for example, when sign_w, axis-w of the base space Vsu are obtained at this time, the space generation unit 45 performs axis adjusting processing which makes the axis of the base space Vt adjust to the base space Vs, and generates new base space Vt as shown in the following formula (2).

Figure 14:
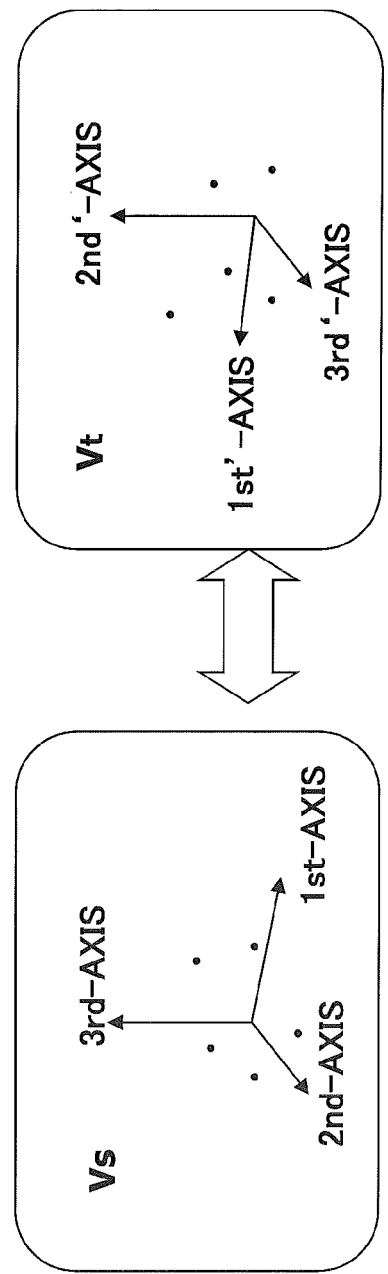
FIG. 14 is a view for explaining the axis adjusting processing of step S31 shown in FIG. 13.

This means adjusting it, when the axes of the base spaces Vs and Vt are not coincident, as shown in FIG. 14 for example.

[Formula 2]

$$Vt'1=-Vt1$$

$$Vt'2=Vt3$$

$$Vt'3=Vt2 \qquad (2)$$

And the space generation unit 45 calculates the degree Tsu of coincidence by the following formula (3).

The degree Tsu of coincidence indicates the sum of the distance "dist" between the coordinates posS (u) of the contents data on the vector Vsu of the base space Vs and the coordinates posT (u) of the contents data on the vector Vtu of the base space Vt corresponding to it. That is, in the case that "the degree Tsu of coincidence=0", it means complete coincident.

[Formula 3]

$$Tsu=sigma(dist(posS(u),posT(u))) \qquad (3)$$

Here, the sigma indicates accumulation of u (1 u p).

Step S33:

The space generation unit 45 adds the degree Tsu of coincidence calculated at step S32 to Variable Tst.

Step S34:

The space generation unit 45 judges whether processing of step S33 has completed about all of u which satisfies "1 u p", if it is judged the process has completed, the space generation unit 45 progresses to step S32, otherwise the space generation unit 45 ends the processing.

[Step S31 (FIG. 13)]

Figure 15:
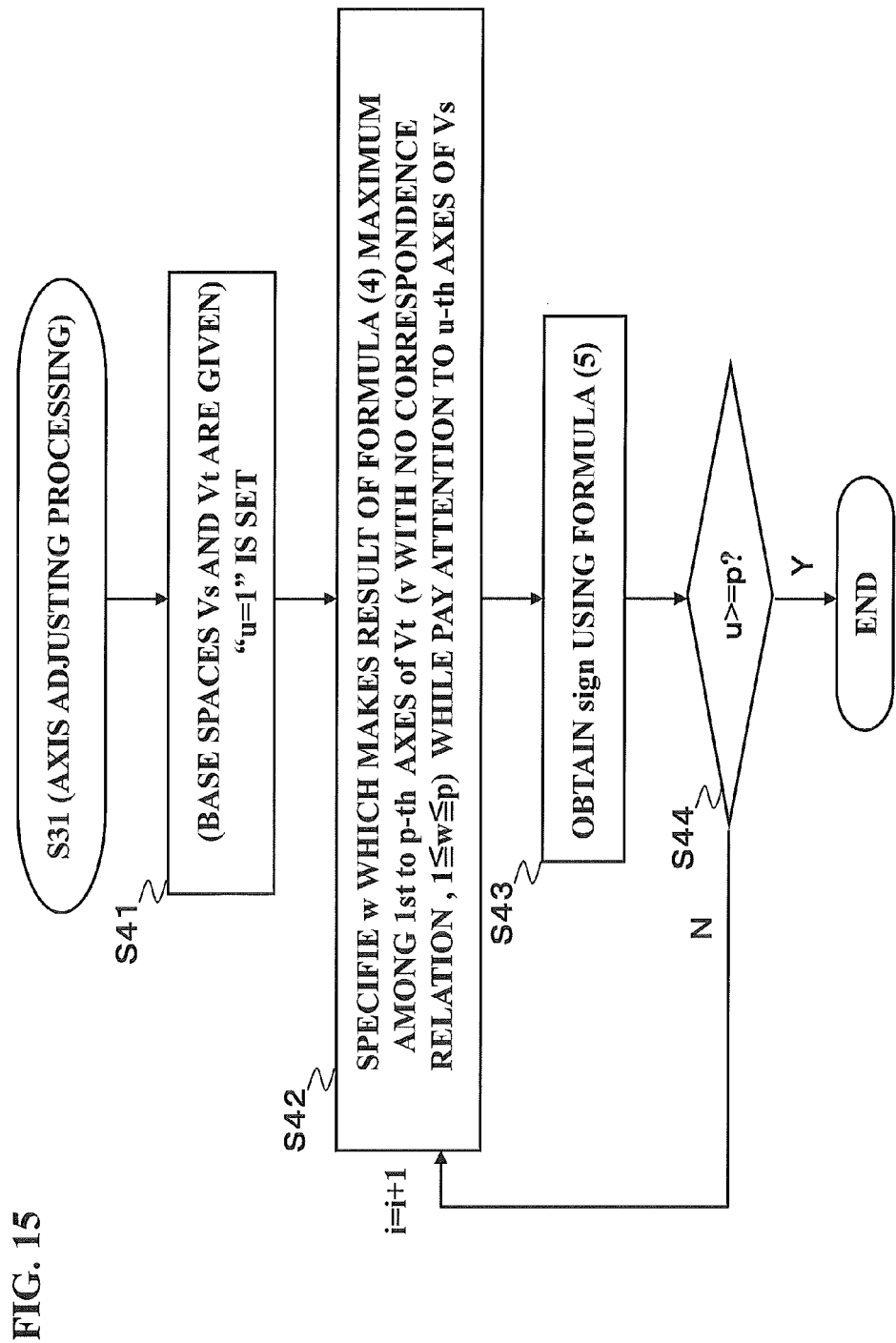
FIG. 15 is a flow chart for explaining the axis adjusting processing of step S31 shown in FIG. 13.

FIG. 15 is a flow chart for explaining an axis adjusting processing of step S31 shown in FIG. 13.

Step S41:

The space generation unit 45 sets "1" to the variable u.

Step S42:

The space generation unit 45 pays attention to the u-th axis (vector Vsu) of one of the selected base space Vs. The space generation unit 45 specifies V which makes the result of the below formula (4) maximum about V (1 u p) with undecided correspondence relations, among the 1st to p-th axes of the base space Vt. Note that, abs{ } indicates an absolute value of the inside of { }.

[Formula 4]

$$abs\{(Vsu*Vtw)/(|Vsu|*|Vtw|)\} \qquad (4)$$

Step S43:

The space generation unit 45 generates "sign" using the following formula (5).

In the following formula (5), "sign" is a function which distinguishes positive/negative. Further, in case of x0, "1" is set to sign(x), and in case of "x<0", "−1" is set to sign(x).

[Formula 5]

$$sign\{(Vsu*Vtw)/(|Vsu|*|Vtw|)\} \qquad (5)$$

Step S44:

The space generation unit 45 ends the processing when satisfying "u p", and carries out increment of u by one to return to step S42 when not satisfying it.

In the processing of step S31 mentioned above, for example in iteration of u=1, as shown in the following table 2, sign_w, axis_w of the vector Vs1 are determined. Next, in iteration of u=2, as shown in the following table 3, sign_w, axis_w of the vector Vs1 are determined. In iteration of u=1, as shown in the following table 4, sign_w, axis_w of the vector Vs1 are determined.

TABLE 2

| Vsi | sign_i | axis_i |
|---|---|---|
| Vs1 | −1 | Vt1 |
| Vs2 | UNDECIED | UNDECIED |
| Vs3 | UNDECIED | UNDECIED |

TABLE 3

| Vsi | sign_i | axis_i |
|---|---|---|
| Vs1 | −1 | Vt1 |
| Vs2 | +1 | Vt3 |
| Vs3 | UNDECIED | UNDECIED |

TABLE 4

| Vsi | sign_i | axis_i |
|---|---|---|
| Vs1 | −1 | Vt1 |
| Vs2 | +1 | Vt3 |
| Vs3 | +1 | Vt2 |

[Space Formation by the Space Generation Unit 45]

In the information space, such as WWW, the space generation unit 45 generates the metadata of contents data, and defines the contents space which includes the coordinates information on contents data based on the metadata.

The terminal apparatus 13 performs generation of the contents reproduction list, and automatic move control (View) on contents space, based on the information of the contents space received from the space generation unit 45.

Further, the space generation unit 45 may generate contents space for every user, based on the user action metadata MD which is generated by the user MD generation unit 43 and indicates registration information, operation history, service use history, etc. of the user. Thereby, the contents data suitable for the user can be shown with the form suitable for the user concerned.

Further, the user MD generation unit 43 generates the user action metadata MD based on the user action history data received from the terminal apparatuses 13 of a plurality of users. And the space generation unit 45 calculates the statistics the result of time use of the whole system by using the user action metadata MD. Thereby, the space generation unit 45 can form the contents space by providing and using the diffusion rate and penetration rate of each contents data having time jitter with respect to the whole user Hereafter, the example of overall operation of the data communication system 1 shown in FIG. 1 will be explained.

[First Example of Operation]

In the example of operation, the case where the space providing unit 44 shown in FIG. 1 generates the contents space information using the contents metadata CMD from the contents MD generation unit 41 will be explained.

The crawler 51 of the space providing serve 15 accesses to the contents site 11 on a network actively, and downloads the contents data stored in the contents site 11 to the crawled contents DB 53.

Next, the contents MD engine 55 analyzes the contents data stored in the crawled contents DB 53 by signal processing, and generates the low level metadata LMD. Further, the contents MD engine 55 generates the high level metadata HMD based on the low level metadata LMD. The contents MD engine 55 writes the low level metadata LMD and the high level metadata HMD into the contents MDDB 57.

The space generation unit 45 inputs the contents metadata CMD from the contents MD generation unit 41, and performs a weighted coefficient determination processing explained using FIG. 10 to FIG. 15, based on the low level metadata LMD contained in the inputted contents metadata CMD. Thereby the base space is determined.

Next, the space generation unit 45 calculates the coordinates of the contents concerned in the base space, based on the low level metadata LMD of each contents data CNT. Thereby, the contents space information is generated.

The space server 49 transmits the contents space information to the terminal apparatus 13.

The control unit 25 of the terminal apparatus 13 displays the image according to the received contents space information on the viewer 27.

The contents space information is information defining the coordinates in space according to the amount of the features of the main part of contents data (metadata, attribute). Therefore, the control unit 25 can express a large number of the main parts of contents data on a network on the display 105 in easy form for user's search according the attribute thereof, on the basis of the space information of the contents.

[Second Example of Operation]

In the example of operation, the case where the space providing unit 44 shown in FIG. 1 generates the contents space information using the contents metadata CMD from the contents MD generation unit 41 and the user action metadata MD from the user MD generation unit 43 will be explained.

The user action management unit 29 of the terminal apparatus 13 generates the user action history data based on the main part of contents data downloaded from the contents site 11 by the operation signal from the terminal apparatus 13 according to the user' operation or by the operation.

The terminal apparatus 13 transmits the user action history data to the space providing serve 15. And the user MD generation unit 43 of the space providing serve 15 generates the user action metadata MD which indicates the attribute of the action of each user and all users, based on the user action history data from the terminal apparatus 13.

The space generation unit 45 inputs the contents metadata CMD from the contents MD generation unit 41 in the same ways with the first example of operation mentioned above.

Further, the space generation unit 45 inputs the user action metadata MD generated by the user action MD generation engine 65.

And the space generation unit 45b determines the base space based on the low level metadata LMD included in the content meta data CDM and the user action meta data MD.

The processing after this is the same as that of the first example of operation mentioned above According to the second example of operation, the contents space can be provided in consideration of user's action history in addition to the feature of contents.

As explained above, according to the data communication system of the present embodiment, the space providing serve 15 accesses actively a plurality of contents sites 11 on a network, analyzes the main part of contents data, and generates the metadata of a plurality of types. And the space providing serve 15 performs formation of the base space and determination of the coordinates in the base space of a large number of the main bodies of the contents data on the network to form the contents space based on the meta data of a plurality of types.

Therefore, the terminal apparatus 13 can express a large number of the contents data in the form easy for searching according to the feature thereof, based on the contents space. The user can access the contents of a favorite attribute easily, while grasping the global image of many contents.

That is, according to the data communication system of the present embodiment, since the coordinates of the contents in contents space are determined as mentioned above, in the terminal apparatus 13, each contents can be displayed not by a list but by position in a space, based on the coordinates. Therefore, it is compatible in grasp of a general view (distant view) of the global image of contents and grasp of content (close-range view) of each contents.

Further, according to the data communication system of the present embodiment, the base space is formed based on a plurality of dimensions (metadata) of the low level metadata LMD (low rank layer), and the contents space is formed by assigning the contents data CNT1 in the base space based on a plurality of the dimensions thereof.

Therefore, the coordinates in the contents space of each contents data can be determined based on the physical and objective feature of the contents data CNTi.

And after determining the coordinates concerned, the high level metadata HMD of each contents data CNTi can be used, and various processing are attained, based on it. That is, since the amount of the features of contents are analyzed and computed, the space which is based on the information suitable for the contents themselves and which is easy for grasping by the user can be provided.

<The Second Embodiment>

In the present embodiment, the space generation unit 45b performs a flag generation processing based on the predetermined metadata for the flag (guide) generation which is decided beforehand among a plurality of metadata which constitute the contents metadata CMD.

In the present embodiment, when contents data is music data, as the attribute of the high level metadata HMD which the space generation unit 45b uses for the flag generation, there are music genre, instrumentation of music, singing voice characteristic of music and mood of a music, and so on, for example.

As a music genre, there are pop, enka, lock, jazz and classic, and so on, for example.

As instrumentation of a music, there are piano solo, acoustic guitar and race percussion instrument, and so on, for example.

As the singing voice characteristic of music, there are male vocal, female vocal, mixed chorus, boy voice, girl voice, and so on, for example.

As mood of a music, there are rhythm, melody, speediness, etc., for example. Specifically as the mood of music, there are soft, sentimental, melodiousness, well-balanced, dreaming, speediness, powerfulness, energetic, simple, dear, urbane and mystical, and so on, for example.

Figure 17:
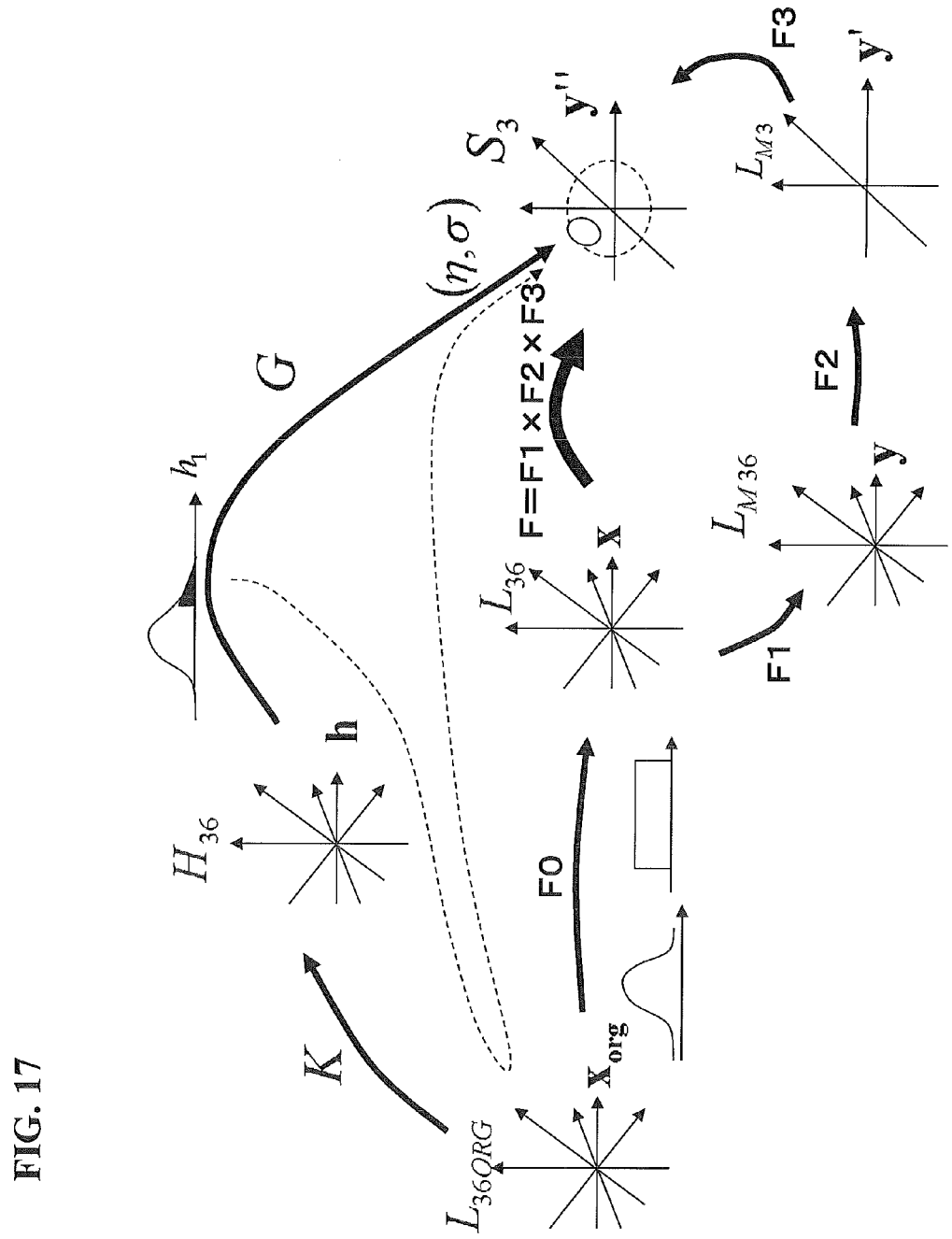
FIG. 17 is a view for explaining concept of the flag generation processing of the data communication system of the second embodiment of the present invention.

The space generation unit 45b specifies the threshold value by which the number of the contents data CNT having the value of the dimension exceeds a predetermined threshold value becomes 0.5% or less of the whole about each of the dimensions (attributes) of the high level metadata HMD used as the target for the flag generation, as shown in FIG. 17. Further, the "0.5%" is an example and is suitably set up according to the purpose of the space generation, and the types of contents, etc.

And the space generation unit 45b specifies the position where the 0.5% or less of contents data CNT are mapped in contents space.

Further, the space generation unit 45b converts uniformly distribution of the space formed by the low level metadata LMD with a function F0, performs space conversion F to the result, and specifies the domain in which the contents data CNT of specific character gathers. And the space generation unit 45b generates a flag to the specified domain, when a fixed condition has been met.

Here, a function F0 is a function which performs conversion of a principal component analysis (F1), a three-dimensional projection (F2) and a spheroidizing (F3) in order.

The present embodiment includes all of the block and the function of the data communication system of the first embodiment. That is, the data communication system of present embodiment has the function which adds the function relating to the flag processing to the function explained in the first embodiment.

Hereafter, the flag generation processing by the space generation unit 45b will be explained.

By forming such a flag in space, visibility for a user to grasp a tendency of the space distribution can be improved.

Figure 18:
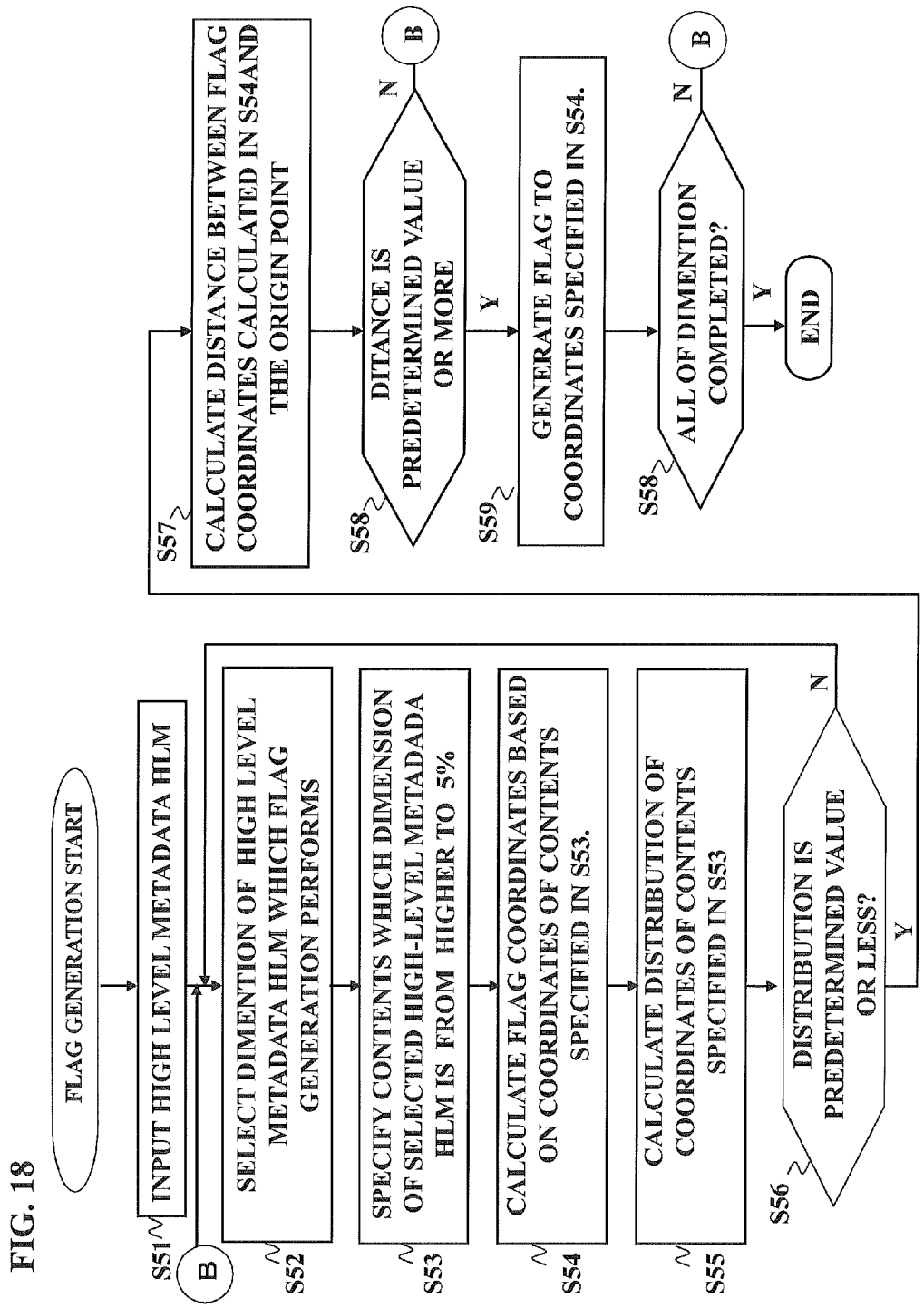
FIG. 18 is a flow chart for explaining the flag generation processing by the space generation unit of the data communication system of the second embodiment of the present invention shown in FIG. 1.

FIG. 18 is a flow chart for explaining the flag generation processing by the space generation unit 45b shown in FIG. 1.

Figure 16:
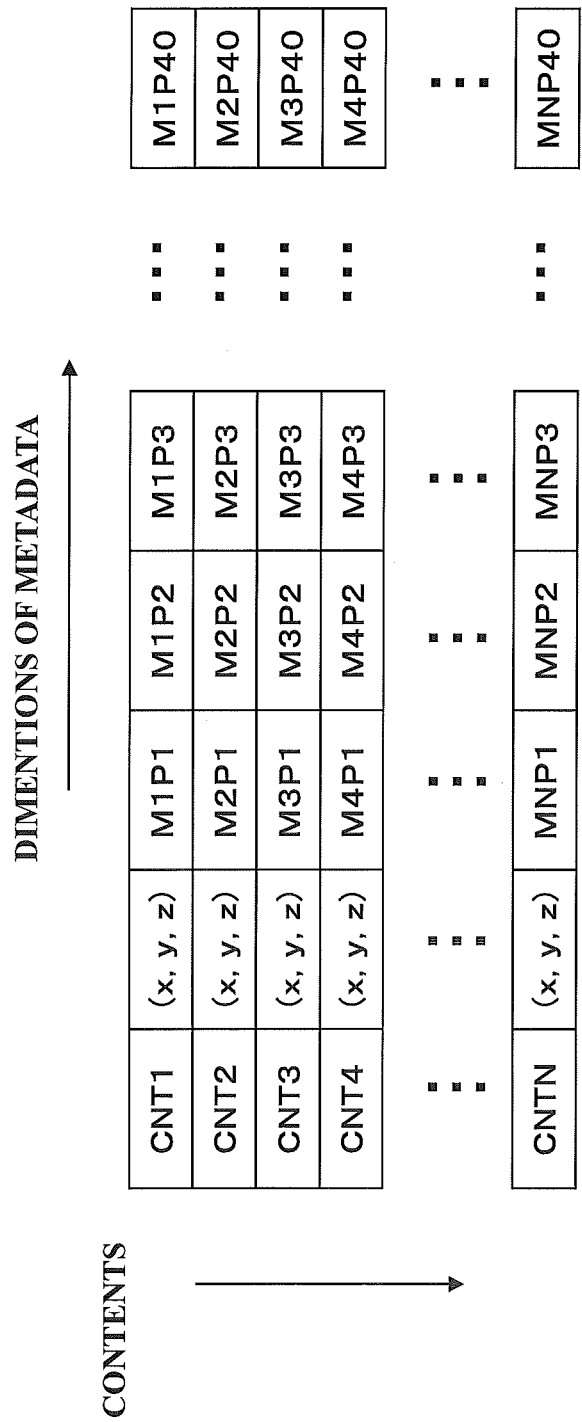
FIG. 16 is a view for explaining meta data which is used in the flag generation processing of the second embodiment of the present invention.

Step S51:

The space generation unit 45b inputs the metadata (the amount of the features) for the flag generation shown in the FIG. 16, etc. contained in the high level metadata HMD mentioned above.

Step S52:

The space generation unit 45b selects the metadata of the dimension which has not been carried out the flag generation processing among the metadata inputted at step S51.

Step S53:

The space generation unit 45b specifies the threshold value by which the number of the contents data CNT having the value of the dimension exceeds a predetermined threshold value becomes 0.5% or less of the whole about each of the dimensions selected at step S52.

And the space generation unit 45b specifies the contents data CNTi meeting the "0.5% or less".

Step S54:

The space generation unit 45b calculates the barycentric coordinate of the coordinates (Xci, Yci, Zci) of the contents data CNTi specified at step S53, and uses this as the flag coordinates Fi (Xfj, Yfj, Zfj).

Thereby the coordinates of each flag can be calculated from the coordinates of the contents data CNTi. The contents data CNTi concerned meets the condition that the value of the dimension of the high level metadata HMD to which the means of the flag corresponds has the higher (or lower) value having a significant difference between the statistical value (average value) of the whole contents data.

Step S55:

The space generation unit 45b calculates the distribution Vj of the coordinates of the contents data CNTi specified at step S53 used for generation of the flag coordinates Fj by using the following formula (6). Here, the flag coordinates are set to Fj (Xfj, Yfj, Zfj), and the coordinates of the contents data belonging to the flag are set to Ci (Xci, Yci, Zci). Further, it is assumed "1 i N".

[Formula 6]

$$Vj = (1/N) * \mathrm{sigma}\{|Xfj - Xci|^2 + |Yfj - Yci|^2 + |Zfj - Zci|^2\} \quad (6)$$

Here the sigma in the formula (6) is related to "1 i N".

Step S56:

The space generation unit 45b judges whether the distribution Vj calculated at step S55 is below a predetermined threshold value or not, when that is right, progresses to step S57, and when that is not right, it returns to step S52. As the threshold value concerned, 0.4 is used, for example.

Thus, by not performing the flag generation when the distribution Vj is large, it is avoidable that the flag which is meaningless as a mark is generated. Further, the "0.4" concerned is an example and is suitably set up according to the purpose of the space generation and the types of the contents, etc.

Step S57:

The space generation unit 45b calculates the distance Dfj between the flag coordinates Fj (Xfj, YFj, Zfj) which is generated at step S54 and the space origin point O (0, 0, 0).

Step S58:

The space generation unit 45b judges whether the distance Dfj calculated at step S57 is a predetermined threshold value or more, when judging that it is right, the space generation unit 45b progresses to step S59, and when that is not right, the space generation unit 45b returns to step S52.

Since it is considered that the contents data CNTi which is mapped near the origin point is less characteristic object from the viewpoint of the characteristic of the contents space, the flag of the powerful feature is mapped on the position long distant from the origin point.

Specifically, supposes that a minimum distance of the threshold value is a constant alpha times of the average value of the distance to all the contents data CNTi used for flag generation from the origin point. Suppose that the distance from the origin point to the flag is longer than the minimum distance. The alpha is 0.5, for example.

Thus, it can be prevented from standing a flag to little feature position by not standing the flag on the coordinates near the origin point. In addition, step S57 and S58 which were mentioned above may be omitted suitably.

Step S59:

The space generation unit 45b matches the flag coordinates Fj (Xfj, YFj, Zfj) generated by the space generation unit 45b in step S54, ID (meta-ID) of the dimension of the high level metadata HMD corresponding to the flag concerned and the meta threshold value of the flag and stores these in the predetermined database of the space providing serve 15 as flag list data, for example.

Here, the meta threshold value of the flag is a threshold value specified at step S53, for example. The threshold value concerned is used as the meta threshold value th_Fj in the flag approach processing mentioned later.

The space generation unit 45b of the present embodiment can generate the flag coordinates Fj (Xfj, YFj, Zfj) of each metadata using contents coordinates Ci (Xci, Yci, Zci) and contents meta (High Level etc.), and can provide the terminal apparatus 13 with these as a flag data together with the label name of the metadata.

Thereby as explained in the first embodiment, the coordinates of the main part of contents data of a large number on a network in contents space can be defined, and the flag coordinates which indicates the attribute (feature) of the domain in which the contents data is located can also be defined.

Therefore, in the terminal apparatus 13, based on the above mentioned contents space, the feature of the large number of the contents data can be grasped while associating with the feature of the flags which are located near the coordinates of the contents data.

Note that, the space generation unit 45b can change the number of flags (guide) by a statistical standard. However, the maximum number is the number of dimensions of metadata, for example "40".

Further, the space generation unit 45b uses the threshold value of each dimension of the metadata used for calculation of the flags for the flag approach processing described below.

[Flag Approach Processing]

In the flag approach processing, the list of the coordinates of flags, meta ID of flags, and meta threshold values of the flags (number of a flag), and the list (several minutes of contents) of the coordinates of contents data and the metadata of contents data are used as inputs. And the list of values which is obtained by placing each of the coordinates of each contents near the coordinates of appropriate flag is outputted.

Here, the degree of approach flag is controllable by a scalar value from the outside.

Visibility can be increased by raising the accuracy of the neighborhood of flags and actualizing a feeling of roughness and fineness according to the flag by performing such a flag approach processing.

Figure 19:
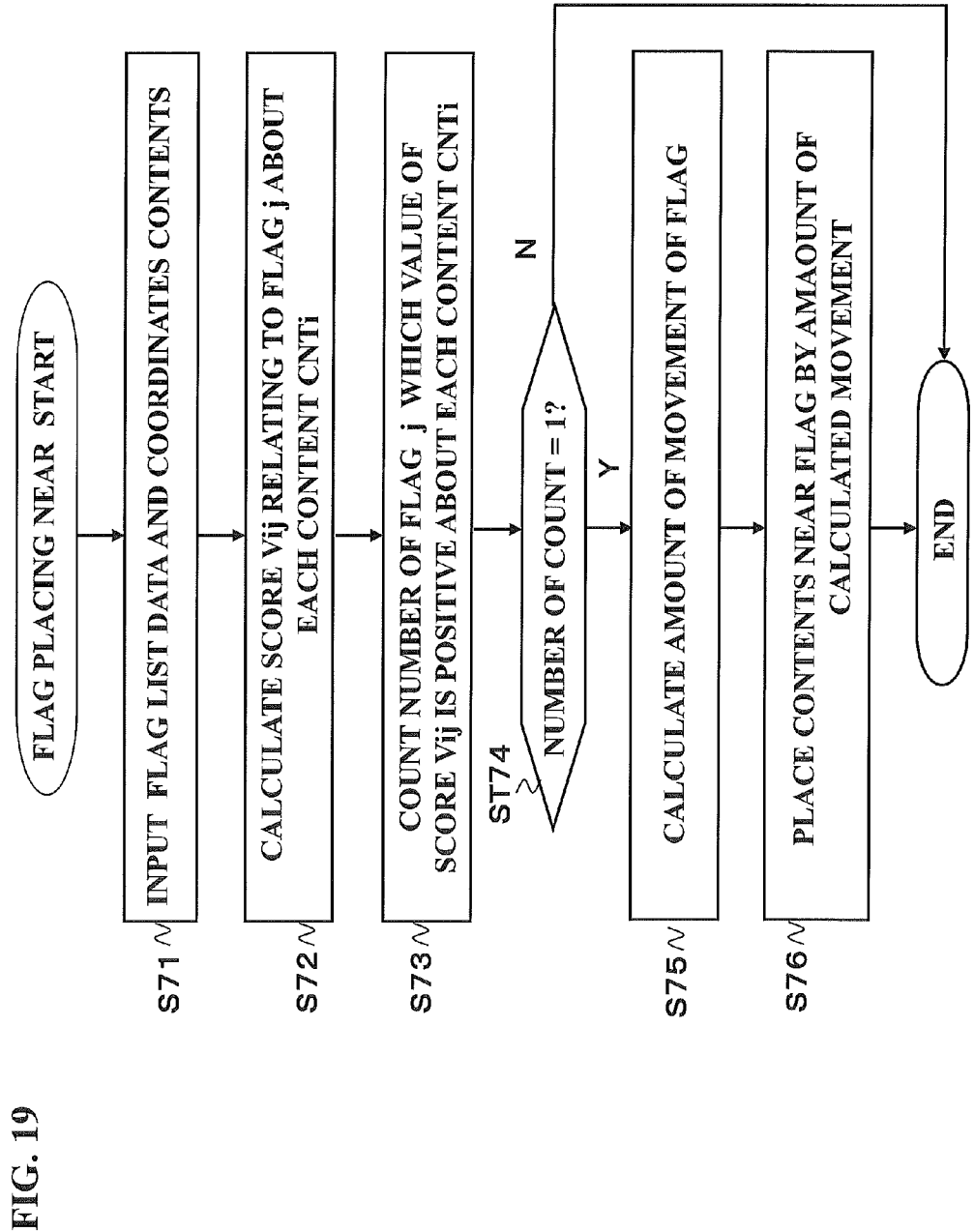
FIG. 19 is a flow chart for explaining flag approach processing by the space generation unit of the data communication system of the second embodiment of the present invention shown in FIG. 1.

FIG. 19 is a flow chart for explaining the flag approach processing performed by the space generation unit 45b shown in FIG. 1.

Step S71:

The space generation unit 45b reads the flag coordinates generated by the flag generation processing explained using FIG. 18, the coordinates Ci (Xci, Yci, Zci) of the contents data CNT, and the contents metadata CMD from the space information DB 47, for example.

Step S72:

The space generation unit 45b generates the score Vij by using the following formula (7) about the combination of the contents data CNTi and flag j.

And the space generation unit 45b determines the direction of making the contents data CNTi approach the flag j, based on the score Vij.

[Formula 7]

$$Vij = M\_ik - th\_Fj \quad (7)$$

Ci: contents data CNTi (1 i N)
Fj: flag j (1 j 40)
idx_Fj: meta ID corresponding to flag j
th_Fj: meta threshold of flag j
M_ik: value of k-th (dimension) high level meta of contents data CNTi
Vij: score of flag j of contents data CNTi Step S73:

The space generation unit 45b counts for every i the number of j which meets the condition that the value of the above-mentioned score Vij generated at step S72 is positive.

Step S74:

The space generation unit 45b progresses to step S75 with respect to the contents data CNTi which the count value of the step S73 is "1", and not perform the flag approach processing (not change the coordinates) with respect to the other contents data CNTi.

Step S75:

The space generation unit 45b determines the distance (the amount of movements) of making the contents data CNTi approach the flag j which the value of the score Vij is positive.

The space generation unit 45b calculates the distance D between the coordinates of the contents data CNTi and the coordinates of Flag j.

And the space generation unit 45b determines a distance "alpha*D" obtained by multiplying the distance D with a constant approach rate alpha (0 alpha 1) as an amount of movement.

Note that, the other proposal also can be adopted. In the proposal, the object near the flag is bring close to the flag by much, and the object far the flag is seldom bring close to the flag, that is, as shown in the following formula (8), the approach rate alpha is changed according to the distance.

[Formula 8]

$$(\text{new alpha}) = (\text{old alpha}) * K/(D+K) \quad (8)$$

Step S76:

The space generation unit 45b generates a new coordinates obtained by moving the coordinates of the contents data CNTi toward the coordinates of the flag j by the amount of movements generated at step S75.

Further, in the technique of FIG. 19 mentioned above, it is not guaranteed that the distance between each contents data and a flag to which the content data is going to approach becomes shorter than the distances with other flags. Therefore, the space generation unit 45b may continue the approach processing until a predetermined condition is met, while increasing the amount by which each contents data approaches the flag by small amount.

[Flag Repelling Processing]

In the flag repelling processing, the contents data is kept away from the flag, when the contents data with low relevance are located near the flag. Thereby, contents can be separated from the flag which should not be positioned near, and the accuracy of the neighborhood of the flag is improved.

Figure 20:
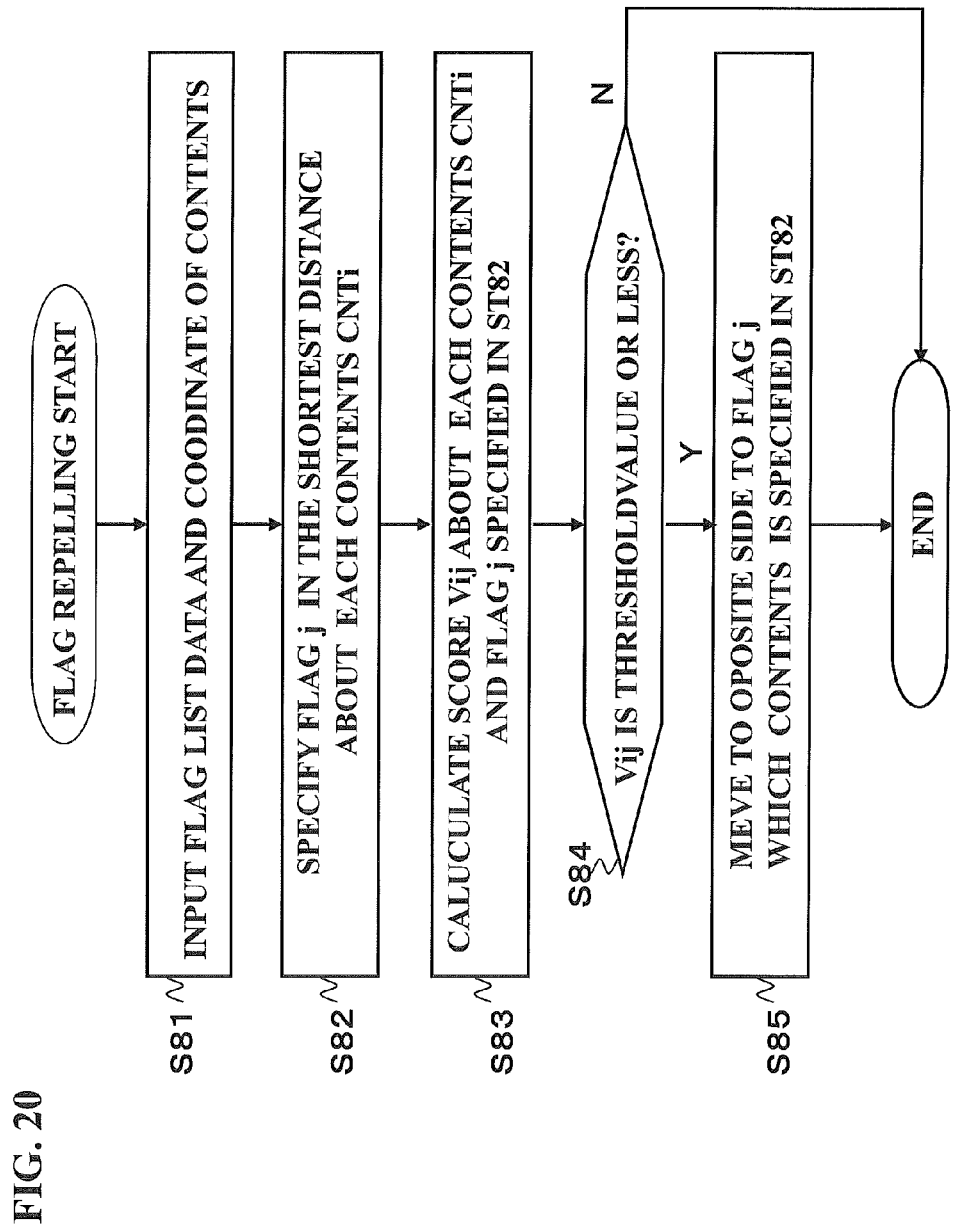
FIG. 20 is a flow chart for explaining the flag repelling processing executed by the space generation unit of the data communication system of the second embodiment of the present invention.

FIG. 20 is a flow chart for explaining the flag repelling processing executed by the space generation unit 45b shown in FIG. 1.

Step S81:

The space generation unit 45b reads the flag coordinates Fj (Xfj, YFj, Zfj) generated by the flag generation processing as explained using FIG. 18, the coordinates Ci (Xci, Yci, Zci) of the contents data CNT and the contents metadata CMD from the space information DB 47, for example.

Step S82:

Based on the coordinates Ci (Xci, Yci, Zci) of the contents data CNTi and the flag coordinates Fj (Xfj, YFj, Zfj) of Flag j, the space generation unit 45b calculates the distance between the both coordinates concerned.

And the space generation unit 45b specifies the flag j which is positioned in the shortest distance to the contents data CNTi, based on the distance calculated as described above.

Step S83:

The space generation unit 45b generates the score Vij based on the above mentioned formula (7) about the flag j specified in step S82.

Step S84:

The space generation unit 45b judges whether or not the score Vij generated at step S83 is a predetermined threshold value or less, that is, whether or not the value of the meta data is enough low.

And if space generation unit 45b judges that the score is the threshold or less, it progresses to step S85, and ends the processing if it is not right (not performs the flag repelling processing).

Step S85:

The space generation unit 45b moves the coordinates Ci (Xci, Yci, Zci) of the contents data CNTi which is target for processing toward the opposite side to the coordinates of the flag j specified in step S82.

Hereafter, all over the processing of the flag generation relation performed by the space generation unit 45b of the present embodiment will be explained.

Figure 21:
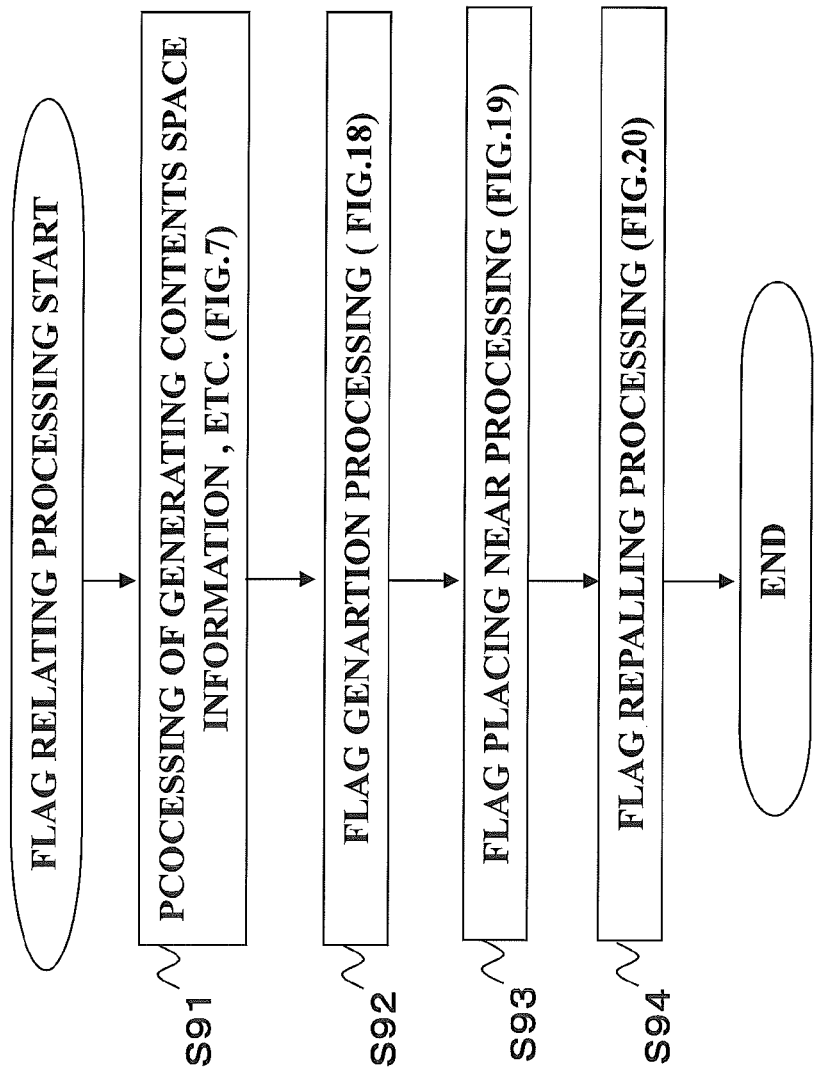
FIG. 21 is a flow chart for explaining the processing of the flag generation relation of the data communication system of the second embodiment of the present invention.

FIG. 21 is a flow chart for explaining all over the processing of the flag generation relation performed by the space generation unit 45b of the second embodiment of the present invention.

Step S91:

The space generation unit 45b generates the coordinates Ci (Xci, Yci, Zci) of each contents data CNTi by the technique explained with the first embodiment using FIG. 7, etc.

Step S92:

The space generation unit 45b performs the flag generation processing explained using FIG. 18, and generates the flag coordinates Fj (Xfj, Yfj, Zfj) of the dimensions (metadata) which are determined for the flag generation.

Step S93:

The space generation unit 45b performs the flag approach processing shown in FIG. 19, and makes the coordinates Ci (Xci, Yci, Zci) of the contents data CNTi approach near the dimension which the flag coordinates are generated in step S92, if needed.

Step S94:

The space generation unit 45b performs the flag repelling processing explained using FIG. 19, and keeps away the coordinates of the contents data CNTi with low relevance from the flag coordinates.

The space generation unit 45b stores the information of the flag coordinates generated by the above mentioned processing and the existence of flag generation into the space information DB 47. And the space server 49 puts these information into the content space information explained in the first embodiment, and transmits it to the terminal apparatus 13.

The terminal apparatus 13 displays the image of the flags on the positions corresponding to the flag coordinates in the screen explained with the first embodiment, based on the flag coordinates included in the received contents space information.

Note that, in the present invention, a flag means what the mark of the meta of contents shows, and it is not necessarily limited to the flag itself.

As explained above, according to the present embodiment of the present invention, the space generation unit 45b can define the flag coordinates indicating the feature (attribute) of the domain where the contents data is positioned while defining the coordinates of a large number of the main parts of contents data on a network in the contents space Therefore, the terminal apparatus 13, based on the above mentioned contents space, can display the feature of the large number of the contents data, relating with the feature of the flag which are positioned near the coordinates of the contents data concerned. And the user can grasp all over the contents space easily based on it.

Further, according to this embodiment, visibility can be increased by raising the accuracy of the neighborhood of the flag and actualizing a feeling of roughness and fineness by performing the flag approach processing according to the flags.

Furthermore, according to this embodiment, the content can be kept away from the flag which the contents should not be positioned neighborhood by the flag repelling processing.

<Third Embodiment>

In the example shown in the FIG. 1 which was explained in the first to third embodiment, the case where the space providing serve 15 realizes the function of the contents MD generation unit 41, the user MD generation unit 43, and the space providing unit 44.

In the present embodiment, the terminal apparatus 13 realizes a part of these functions, for example.

Figure 22:
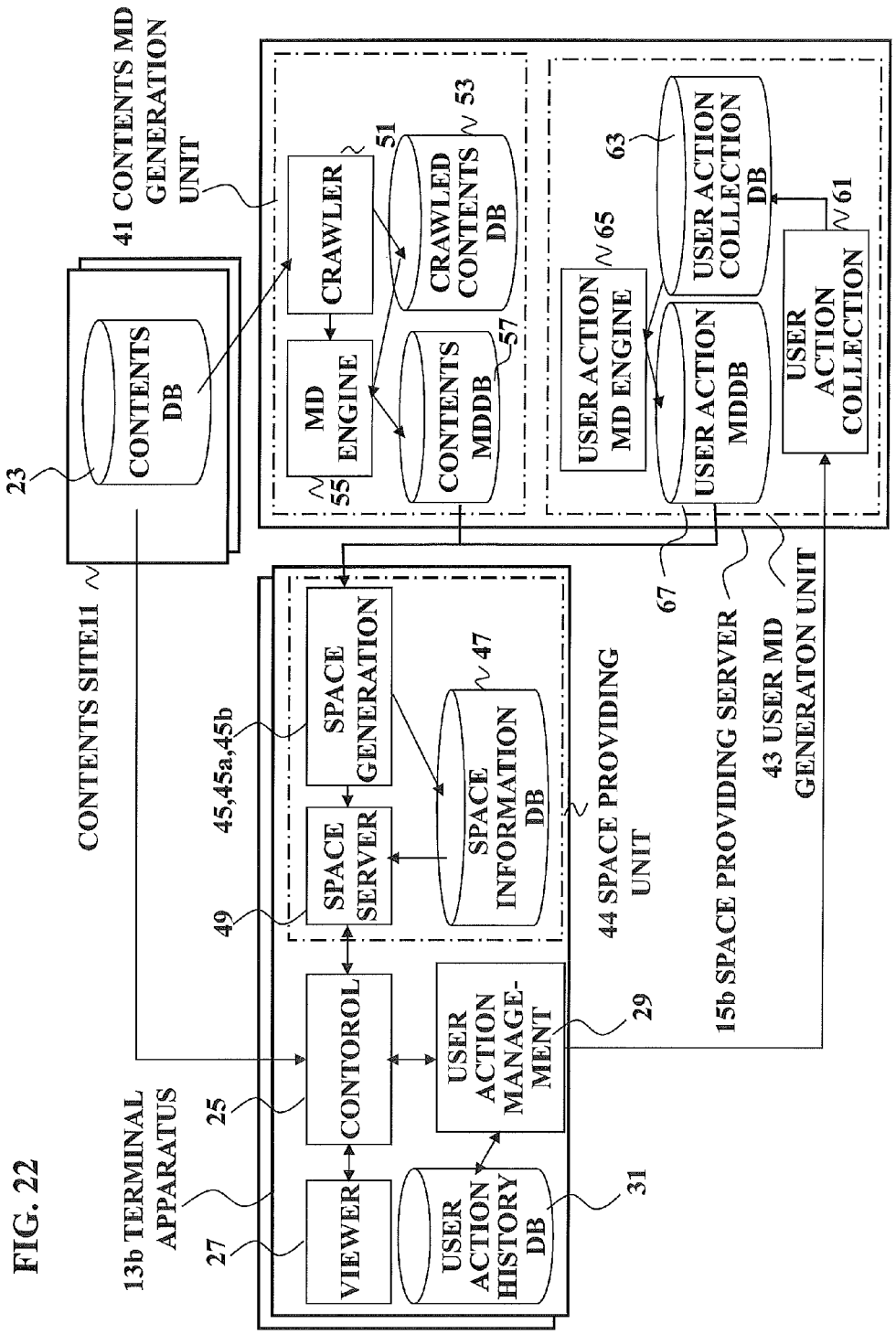
FIG. 22 is a view for explaining the data communication system of the first example of the third embodiment of the present invention.

FIG. 22 is a view for explaining the data communication system of the first example of the third embodiment of the present invention.

The example shown in FIG. 22 is example of the invention of the 6th and 7th viewpoints.

In the data communication system shown in FIG. 22, the terminal apparatus 13b realizes the function of the contents MD generation unit 41 mentioned above. And the [15b] realizes the user MD generation unit 43 and the space providing unit 44 function.

In this case, the space generation unit 45, space generation unit 45a and space generation unit 45b of the space providing unit 44 receive the contents metadata CMD and the user action metadata MD from the contents MD generation unit 41 through a network, and form the contents space based on these.

Note that, the space generation unit 45, space generation unit 45a, and space generation unit 45b may form unique contents space for the user concerned, using directly the user action history data which the user action management unit 29 generated.

According to the data communication system shown FIG. 22, the processing burden of the [15b] can be reduced by giving the terminal apparatus 13b the function of the space providing unit 44.

Figure 23:
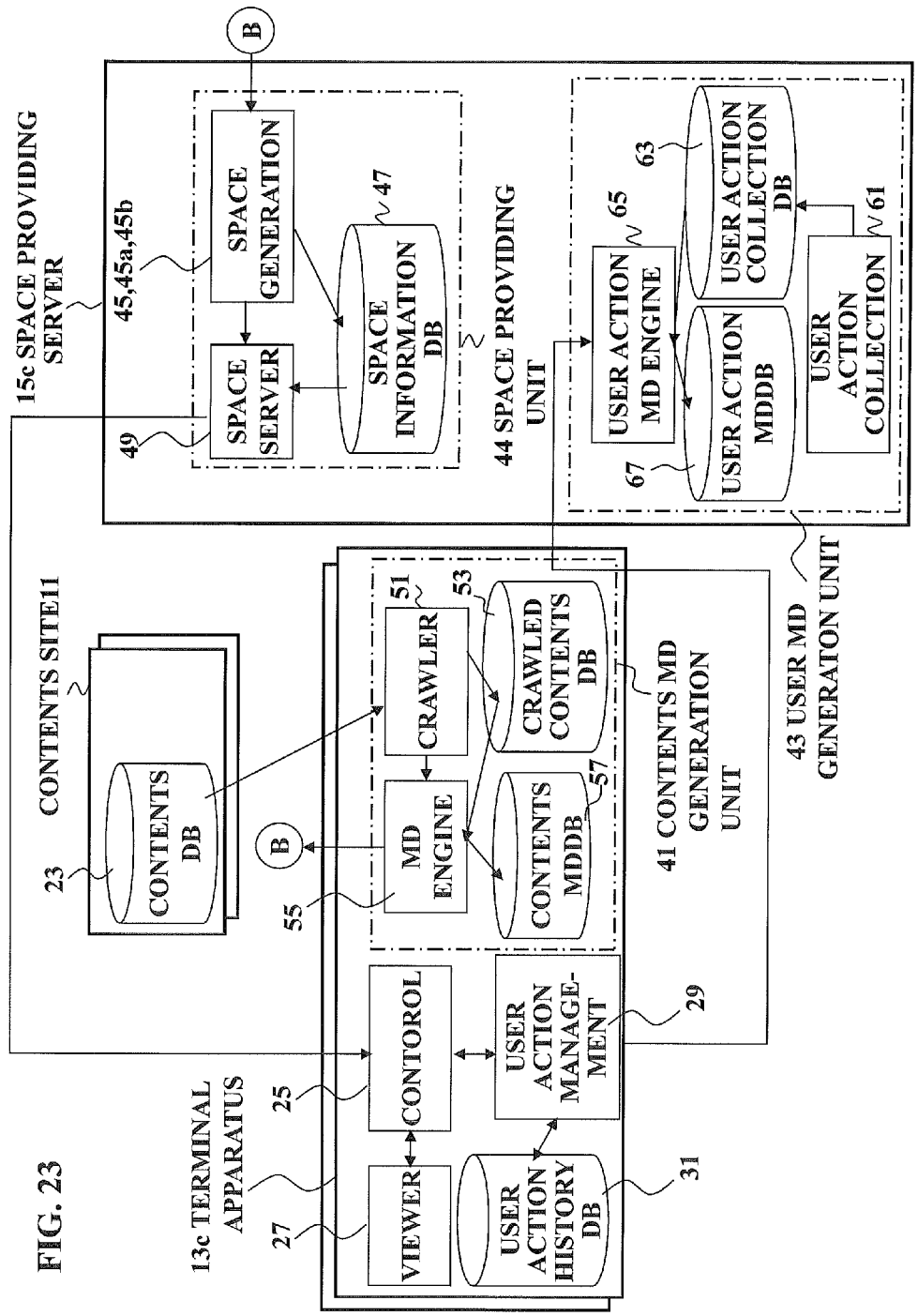
FIG. 23 is a view for explaining the data communication system of the second example of the third embodiment of this invention.

FIG. 23 is a view for explaining the data communication system of the second example of the third embodiment of this invention.

The example shown in FIG. 22 is an example of invention of the 8th and 9th viewpoints.

In the data communication system shown in FIG. 23, the terminal apparatus 13c realizes the function of the contents MD generation unit 41 mentioned above. And the space providing server 15c realizes the function of the user MD generation unit 43 and the space providing unit 44.

In this case, the contents MD generation unit 41 in the terminal apparatus 13c accesses the contents site 11 on a network actively, and generates the contents metadata CMD. And the terminal apparatus 13c transmits the above-mentioned contents metadata CMD to the space providing server 15c.

The space generation units 45, 45a and 45b of the space providing server 15c generate the contents space based on the contents metadata CMD received from the terminal apparatus 13c, and provide the terminal apparatus 13c with this.

According to the data communication system shown in FIG. 23, the processing burden of the space providing server 15c can be reduced by giving the terminal apparatus 13c the function of the contents MD generation unit 41.

That is, when the contents data CNT is video, and so on, the generation processing load of the contents metadata CMD is very large. Therefore it can distribute the processing by making the terminal apparatus 13c perform all or a part of this function, and can realize a real time contents space.

Note that, you may give a certain privilege to the user of the terminal apparatus 13c which permit performing the generation processing of the contents metadata CMD in this case. Thereby, the number of the terminal apparatus 13c which perform the generation processing of the contents metadata CMD may be increased. In addition, both function of the contents MD generation unit 41 and the space providing unit 44 shown in FIG. 1 may be given to the terminal apparatus 13.

Although in the above embodiment, the case where the contents MD engine 55 generates the low level metadata LMD and generates the high level metadata HMD based on the low level metadata is illustrated, the generation of the low level metadata LMD and the generation of the high level metadata HMD may be performed independently by any contractors (sever).

Further, the output from the provider of the contents data CNT may be used as all or part of the low level metadata LMD and the high level metadata HMD.

<Fourth Embodiment>

In the present embodiment, a processing for a screen display based on the contents space information by the terminal apparatus 13, etc. shown in FIG. 1 will be explained.

As mentioned above, the control unit 25 of the terminal apparatus 13, etc. receives the contents space information from the space providing unit 44, and displays the image according to it on the viewer 27.

The contents space information concerned is information which defines the coordinates in space according to the attribute (metadata) of the main part of contents data. The control unit 25 displays a large number of contents on a network with the form easy for user's search according to the features (attribute) thereof based on contents space information.

Figure 24:
FIG. 24 is a view for explaining the display screen of the terminal device of the fourth embodiment of this invention.

In the present embodiment, for example, based on the coordinates (Xci, Yci, Zci) of the contents data CNTi contained in the contents space information from the space providing unit 44, as shown in FIG. 24, the control unit 25 of the terminal apparatus 13 converts the coordinates concerned into the two dimensional coordinates on the surface of a sphere 202 which imagined the earth, and generates the image data of screen 201 which displays the image CIMi corresponding to the contents data CNTi on the coordinates.

The image CIMi of the contents data CNTi with a near attribute is arranged near the position on the surface of a sphere 202 by the characteristic of coordinates (Xci, Yci, Zci) explained in the first embodiment.

In the image CMIi displayed on screen 201 shown in FIG. 24, the image corresponding to the contents data CNTi is displayed.

When the contents data CNTi is music data, the jacket image of the music is displayed in image CIMi.

When the contents data CNTi is video data, the video is displayed in image CIMi.

In the present embodiment, the image actually stored in the contents site 11 is used for real time as the image displayed in image CIMi.

A user operates the operation unit 103 of the terminal apparatus 13 shown in FIG. 2, and moves on the surface of sphere 202, in the image which he is walking on the earth. And for example, a speaker (not illustrated in figure) performs audio output of the contents data CNTi nearest to the user movement position (coordinates) on the surface of the sphere 202. Thereby, three dimensional sound space can be provided.

Note that, the objects of various kinds, such as music data, video data, page of a blog, and advertising page may be mixed as contents data CNTi which displays the image CIMi in one screen 201.

Figure 25:
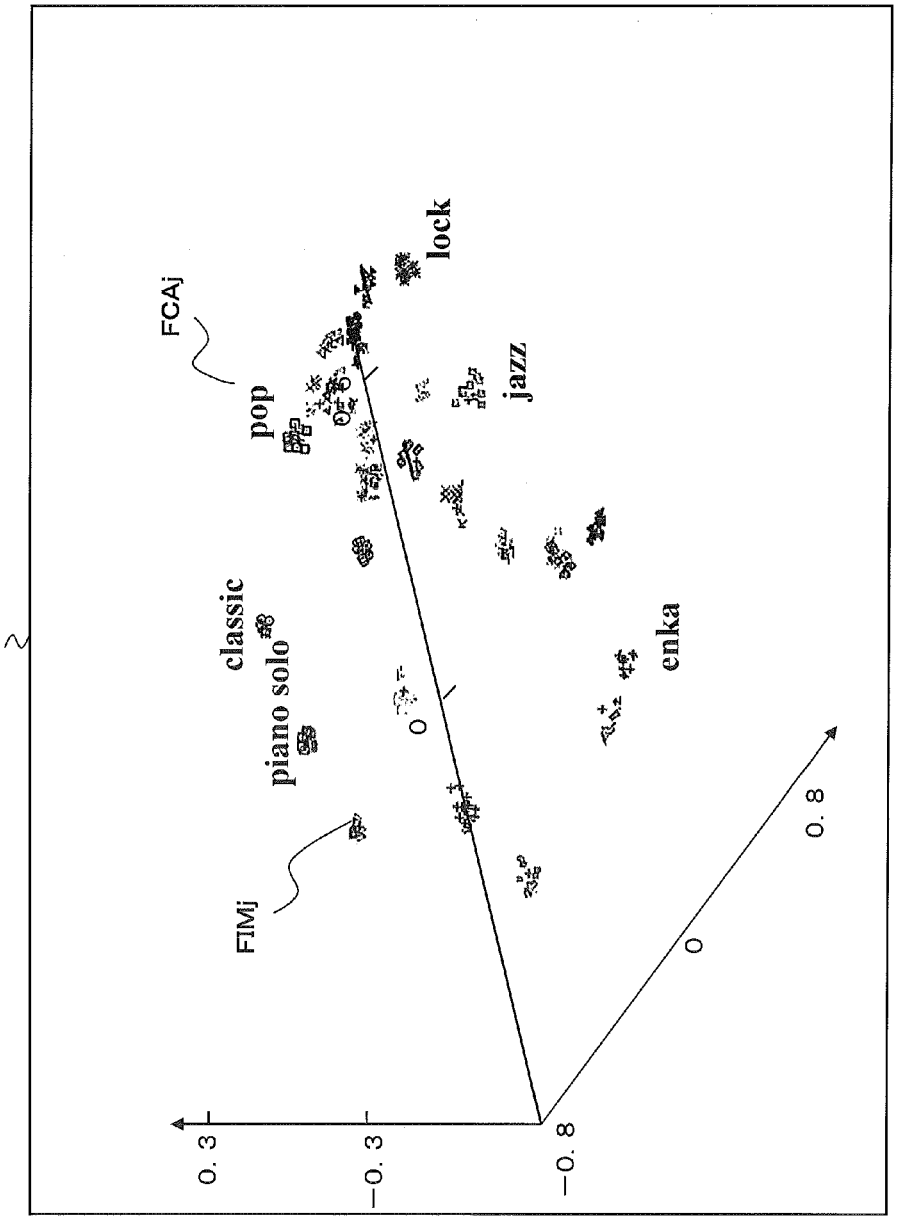
FIG. 25 is a view for explaining the other display screen of the terminal device of the fourth embodiment of this invention.

Further, when the control unit 25 shown in FIG. 1 receives the flag coordinates Fj (Xfj, Yfj, Zfj) from the space providing server 15b of the second embodiment, for example, image data which displays the flag image FMIj corresponding to the flag j on the position corresponding to the flag coordinates Fj (Xfj, Yfj, Zfj) in screen 221 imaging a three dimensional space as shown in FIG. 25 is generated Further, the control unit 25 displays the character FCAj indicating the attribute of the flag near the flag image FIMj in screen 221, for example.

Figure 26:
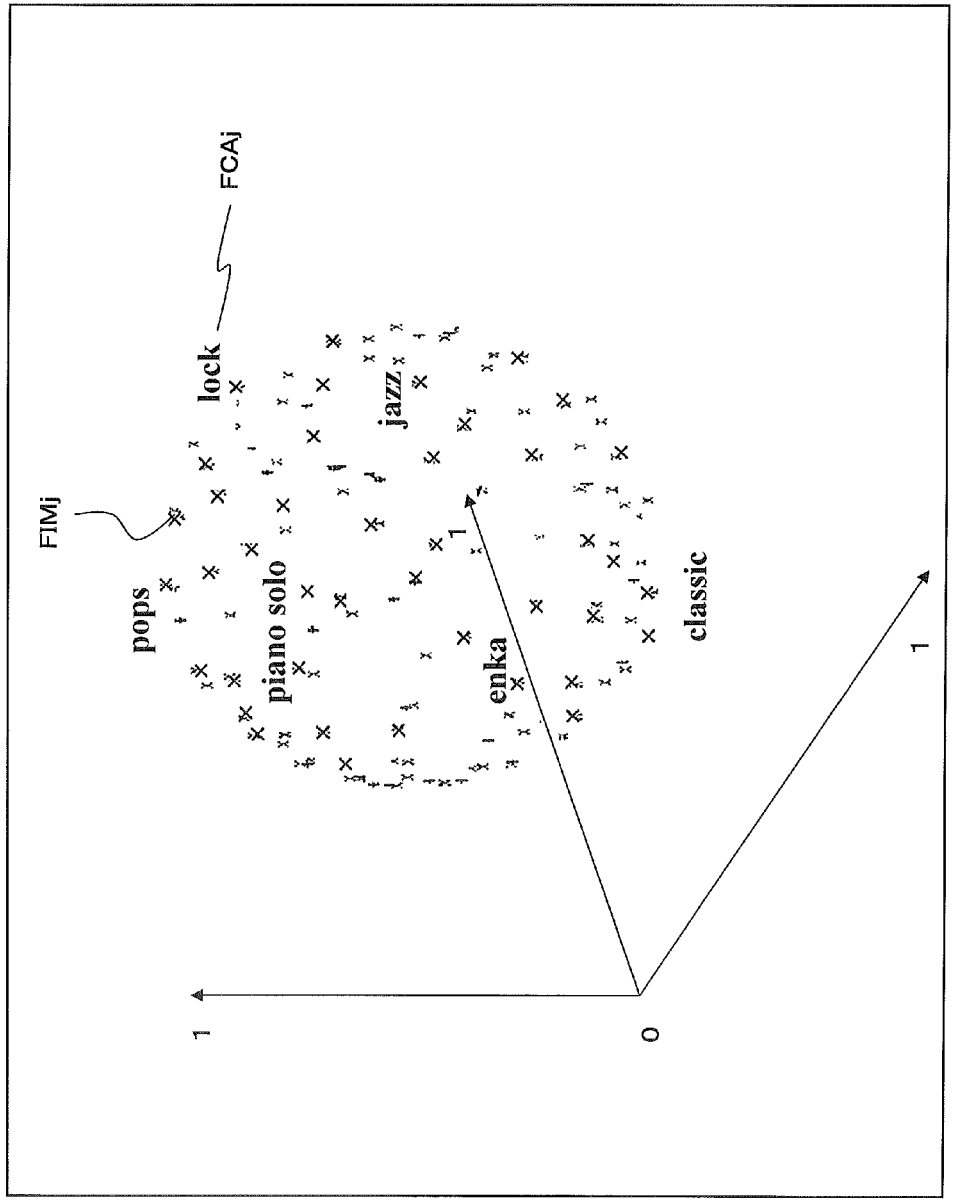
FIG. 26 is a view for explaining the other display screen of the terminal device of the fourth embodiment of this invention.

Note that, as other example of the screen displayed by the control unit 25, as shown in FIG. 26, a ball is imagined, and there is a screen which displays the image of the character FCAj and the flag FIMj inside the ball and surface of the ball.

Figure 27:
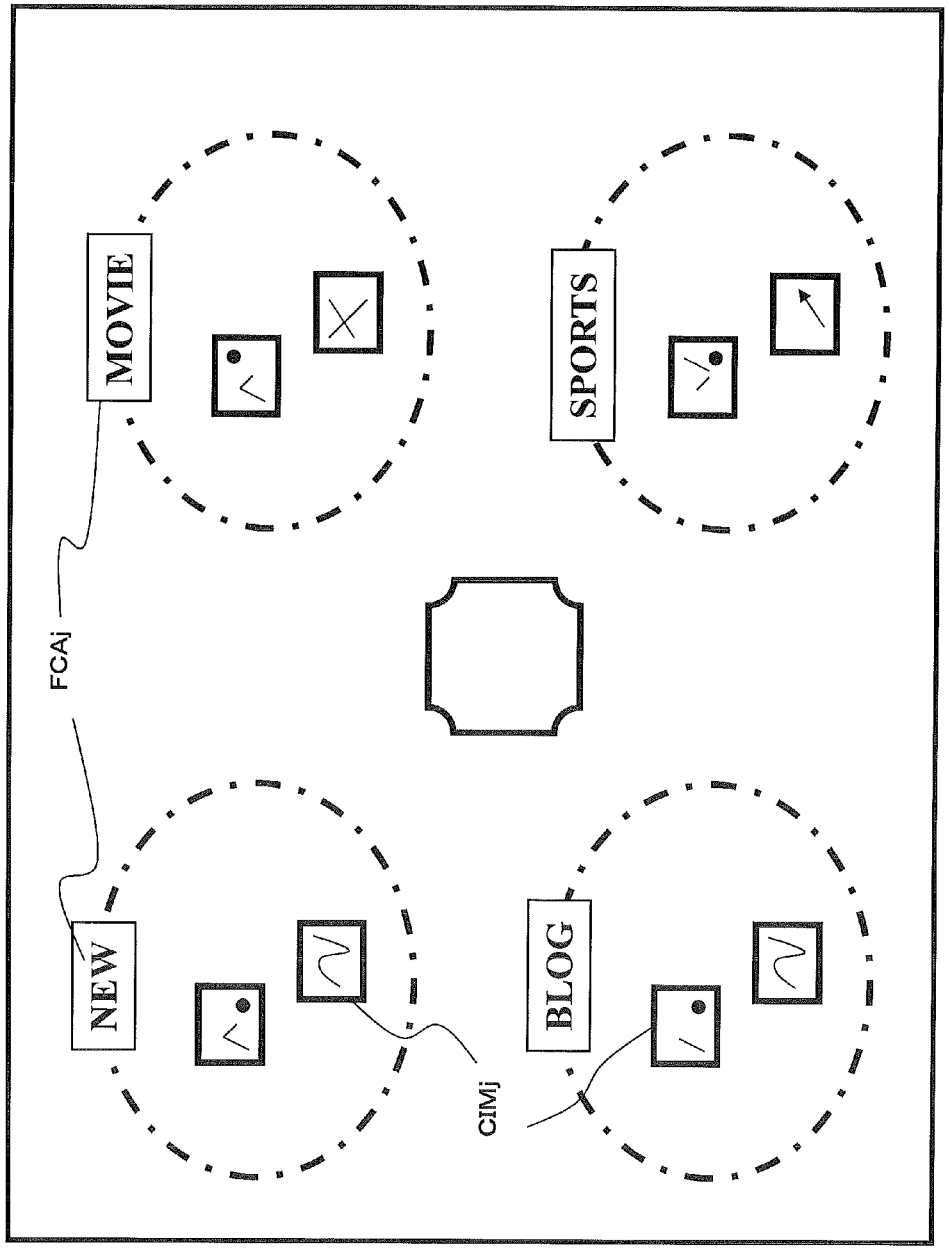
FIG. 27 is a view for explaining the other display screen of the terminal device of the fourth embodiment of this invention.

Further, the control unit 25 displays the image CIMi corresponding to the contents data CNTi of the feature on the coordinates in the domain of four corners of a screen according to the feature of contents, for example, as shown in FIG. 27. Further, the control unit 25 displays the character FCAj indicating the feature on the domain of the four corners.

The present invention is not limited to the above embodiments.

It will be appreciated by those skilled in the art which various modifications, combinations, sub-combinations, and replacements may be made in part or all of the components within the technical scope and its equivalents of the present invention.

Although the case where the contents on a network are mapped into contents space was illustrated in the embodiment mentioned above, it can apply also to the case that the contents stored in a memory of a predetermined computer other than that on a network is mapped into the contents space, similarly.

For example, the contents, etc. memorized in the memory of the terminal apparatus 13 may be used as the target.

Further, the user of the terminal apparatus 13 may specify a keyword to the space providing serve 15, and the space generation unit 45b may select axis with high relevance to the keyword concerned, and form the base space for example. Thereby, the contents space relevant to the viewpoint which the user is going to search can be provided.

Further, in the present embodiment described above, although the generation of the base space and the calculation (space analysis) of the coordinates of contents data are performed based on the low level metadata LMD, these processing may be performed based on the high level metadata HMD. Further, these processing may be performed based on both of the low level metadata LMD and the high level metadata HMD.

Further, although in the present embodiment described above, the case where the crawler 51 shown in FIG. 1 accesses actively to the contents site 11 on a network is illustrated, the contents site 11 may transmit actively the contents to the space providing serve 15.

This invention is applicable to the system which displays a plurality of contents based on the feature.

| Explanation of Reference | |
|---|---|
| 11 | contents site |
| 13 | terminal apparatus |
| 15 | space providing server |
| 23 | contents DB |
| 25 | control unit |
| 27 | viewer |
| 29 | user action management unit |
| 31 | user action history DB |
| 41 | contents MD generation unit |
| 43 | user MD generation unit |
| 44 | space providing unit |
| 45, 45a, 45b | space generation unit |
| 47 | space information DB |
| 49 | space server |
| 51 | crawler |
| 53 | crawled contents DB |
| 55 | contents MD engine |
| 57 | contents MDDB |
| 61 | user action collection unit |
| 63 | collection user action DB |
| 65 | user action MD generation engine |
| 67 | user action MDDB |
| 103, 203 | operation unit |
| 105, 205 | display |
| 107, 207 | interface |
| 113, 213 | processing circuit |

The invention claimed is:

1. A contents space forming apparatus, comprising:
a space definition means for defining a space formed in memory to which said contents are mapped, based on metadata of a plurality of types which are defined for each of a plurality of contents, wherein said types of metadata comprises low level metadata and high level metadata, wherein said low level metadata is an attribute of the content that is computable in signal processing and represented by an N-dimensional physical numerical value(s), N being two or more, and wherein said high level metadata is generated by analyzing the N-dimensional physical numerical value(s) of the low level metadata and producing a one-dimensional value therefrom; and
a coordinates calculation means for calculating coordinates to which each of said contents is mapped in said space defined by said space definition means, based on the metadata of said plurality of types of contents.

2. A contents space forming apparatus of claim 1, wherein said space definition means defines said space, based on said metadata computable by analyzing said contents using signal processing, said coordinates calculation means calculates said coordinates based on the metadata.

3. A contents space forming apparatus of claim 1, wherein said coordinates calculation means calculates said coordinates based on the metadata of said plurality of types of contents and a weight defined to the metadata.

4. A contents space forming apparatus of claim 3, wherein
said space definition means assigns said plurality of contents to a plurality of parent populations, generates a base space of said contents assigned to said parent population based on said weight about each of the parent populations, and specifies said weight by which a degree of coincidence between said base spaces of said plurality of parent populations meets a predetermined condition,
said coordinates calculation means calculates said coordinates based on said weight specified by said space definition means.

5. A contents space forming apparatus of claim 4, wherein said space definition means calculates said degree of coincidence after performing axis adjusting processing of said base space of said plurality of parent populations.

6. A contents space forming apparatus of claim 1, further comprising: a feature amount obtaining means for analyzing said contents by signal processing to obtain said metadata of said plurality of types of contents about each of said plurality of contents.

7. A contents space forming apparatus of claim 6, wherein said feature amount obtaining means accesses to contents on a network to obtain said metadata.

8. A contents space forming apparatus of claim 1, further comprising: a user usage form analyzing means for collecting a user usage form history data indicating history of usage form of said plurality of contents by users and analyzing said user usage form history data to generate analysis data, wherein said space definition means defines said space further using said analysis data generated by said space definition means.

9. A contents space forming apparatus of claim 8, wherein said space definition means selects some contents of said plurality of contents based on said user usage form history data of some of user among a plurality of users, and
determines said metadata to be used for definition of said space among said metadata of a plurality of types, based on statistical value of said metadata of the selected contents and statistical value of said metadata of said plurality of contents.

10. A contents space forming method, comprising:
a space definition step for defining a space to which said contents are mapped, based on metadata of a plurality of types, wherein said types of metadata comprises low level metadata and high level metadata, which are defined for each of a plurality of contents, wherein said low level metadata is an attribute of the content that is computable in signal processing and represented by an N-dimensional physical numerical value(s), N being two or more, and wherein said high level metadata is generated by analyzing the N-dimensional physical numerical value(s) of the low level metadata and producing a one-dimensional value therefrom; and a coordinates calculation step for calculating coordinates to which each of said contents is mapped in said space defined at said space definition step, based on the metadata of said plurality of types of contents.

11. A non-transitory, computer readable storage medium containing a program that may be executed by a computer, and which causes the computer to carry out actions, comprising:

a space definition step for defining a space to which said contents are mapped, based on an metadata of a plurality of types, wherein said types of metadata comprises low level metadata and high level metadata, which are defined for each of a plurality of contents, wherein said low level metadata is an attribute of the content that is computable in signal processing and represented by an N-dimensional physical numerical value(s), N being two or more, and wherein said high level metadata is generated by analyzing the N-dimensional physical numerical value(s) of the low level metadata and producing a one-dimensional value therefrom; and a coordinates calculation step for calculating coordinates to which each of said contents is mapped in said space defined at said space definition step, based on the metadata of said plurality of types of contents.

12. A non-transitory, computer readable storage media storing a program that may be executed by a computer, said program comprising:

a space definition module for defining a space to which said contents are mapped, based on metadata of features of a plurality of types, wherein said types of metadata comprises low level metadata and high level metadata, which are defined for each of a plurality of contents, wherein said low level metadata is an attribute of the content that is computable in signal processing and represented by an N-dimensional physical numerical value(s), N being two or more, and wherein said high level metadata is generated by analyzing the N-dimensional physical numerical value(s) of the low level metadata and producing a one-dimensional value therefrom, and a coordinates calculation module for calculating coordinates to which each of said contents is mapped in said space defined at said space definition step, based on the metadata of said plurality of types of contents.

13. A data communication method using a contents space forming apparatus and a terminal apparatus, the method comprising:

a space definition step in which said contents space forming apparatus defines a space formed in memory to which said contents are mapped, based on metadata of a plurality of types, wherein said types of metadata comprises low level metadata and high level metadata, which are defined for each of a plurality of contents, wherein said low level metadata is an attribute of the content that is computable in signal processing and represented by an N-dimensional physical numerical value(s), N being two or more, and wherein said high level metadata is generated by analyzing the N-dimensional physical numerical value(s) of the low level metadata and producing a one-dimensional value therefrom;

a coordinates calculation step in which said contents space forming apparatus calculates coordinates to which each of said contents is mapped in said space defined by said space definition step, based on the metadata of said plurality of types of contents;

a transmitting step in which said contents space forming apparatus transmits the coordinates calculated in said coordinates calculation step to said terminal apparatus; and a display processing step in which said terminal apparatus displays a screen which includes image corresponding to said contents, based on the coordinates received in said transmitting step.

14. A computer, comprising:

a space definition means for defining a space formed in memory to which said contents are mapped, based on an metadata of a plurality of types, wherein said types of metadata comprises low level metadata and high level metadata, which are defined for each of a plurality of contents, wherein said low level metadata is an attribute of the content that is computable in signal processing and represented by an N-dimensional physical numerical value(s), N being two or more, and wherein said high level metadata is generated by analyzing the N-dimensional physical numerical value(s) of the low level metadata and producing a one-dimensional value therefrom;

a coordinates calculation means for calculating coordinates to which each of said contents is mapped in said space defined by said space definition means, based on the metadata of said plurality of types of contents; and a display processing means for displaying a screen which includes image corresponding to said contents, based on the coordinates calculated by said coordinates calculation means.

15. A computer of claim 14, further comprising:

a user usage form history generation means for generating a user usage form history data indicating a history of usage form of a plurality of contents by user, wherein said space definition means defines said space further using said user usage form history generated by said user usage form history data or data generated based on said user usage form history data.

16. A non-transitory, computer readable storage medium containing a program that may be executed by a computer, and which causes the computer to carry out actions, comprising:

a space definition step for defining a space to which said contents are mapped, based on an metadata of a plurality of types, wherein said types of metadata comprises low level metadata and high level metadata, which are defined for each of a plurality of contents, wherein said low level metadata is an attribute of the content that is computable in signal processing and represented by an N-dimensional physical numerical value(s), N being two or more, and wherein said high level metadata is generated by analyzing the N-dimensional physical numerical value(s) of the low level metadata and producing a one-dimensional value therefrom;

a coordinates calculation step for calculating coordinates to which each of said contents is mapped in said space defined at said space definition step, based on the metadata of said plurality of types of contents; and a display processing step for displaying a screen which includes image corresponding to said contents, based on the coordinates calculated in said coordinates calculation step.

17. A computer, comprising:

a metadata generation means for analyzing contents to generate, and store in a computer readable storage medium, metadata of a plurality of types, wherein said types of metadata comprises low level metadata and high level metadata, which are defined for each of a plurality of contents, wherein said low level metadata is an attribute of the content that is computable in signal processing and represented by an N-dimensional physical numerical value(s), N being two or more, and wherein said high level metadata is generated by analyzing the N-dimensional physical numerical value(s) of the low level metadata and producing a one-dimensional value therefrom; and a display processing means for transmitting said metadata generated by said metadata generation means, and displays a screen which includes image corresponding to said contents, based on the coordinates calculated in a predetermined space which is received corresponding to said transmitting.

18. A non-transitory, computer readable storage medium containing a program that may be executed by a computer, and which causes the computer to carry out actions, comprising:

a feature amount generation step for analyzing contents to generate an metadata of a plurality of types, wherein said types of metadata comprises low level metadata and high level metadata, about each of a plurality of contents, wherein said low level metadata is an attribute of the content that is computable in signal processing and represented by an N-dimensional physical numerical value(s), N being two or more, and wherein said high level metadata is generated by analyzing the N-dimensional physical numerical value(s) of the low level metadata and producing a one-dimensional value therefrom; and a display processing step for transmitting said metadata generated by said feature amount generation step, and displays a screen which includes image corresponding to said contents, based on the coordinates calculated in a predetermined space which is received.

19. A computer implemented contents space forming apparatus of claim 1, wherein a flag generation process, based at least in part on said high level metadata, is performed by said space definition means to generate one or more flags to be used as a visible guide in said space.

20. A contents space forming apparatus of claim 1, further comprising a crawler configured to actively transmit content to said space definition means.

21. A contents space forming apparatus of claim 1, further comprising a metadata generation unit configured to provide said contents to said space definition means.

* * * * *